US010388930B2

(12) United States Patent
Sasaki

(10) Patent No.: US 10,388,930 B2
(45) Date of Patent: Aug. 20, 2019

(54) LAMINATE FOR NON-AQUEOUS SECONDARY BATTERY, METHOD OF MANUFACTURING THE SAME, AND NON-AQUEOUS SECONDARY BATTERY

(71) Applicant: ZEON CORPORATION, Chiyoda-ku, Tokyo (JP)

(72) Inventor: Tomokazu Sasaki, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 125 days.

(21) Appl. No.: 15/316,841

(22) PCT Filed: May 28, 2015

(86) PCT No.: PCT/JP2015/002713
§ 371 (c)(1),
(2) Date: Dec. 7, 2016

(87) PCT Pub. No.: WO2015/198530
PCT Pub. Date: Dec. 30, 2015

(65) Prior Publication Data
US 2017/0117521 A1   Apr. 27, 2017

(30) Foreign Application Priority Data
Jun. 26, 2014   (JP) .............................. 2014-131571

(51) Int. Cl.
*H01M 2/16*   (2006.01)
*H01M 4/13*   (2010.01)
(Continued)

(52) U.S. Cl.
CPC ............. *H01M 2/168* (2013.01); *H01M 2/16* (2013.01); *H01M 2/166* (2013.01);
(Continued)

(58) Field of Classification Search
None
See application file for complete search history.

(56) References Cited

U.S. PATENT DOCUMENTS

2005/0014063 A1*   1/2005   Shi ..................... H01M 2/145
                                                                429/144
2009/0136846 A1    5/2009   Lee et al.
(Continued)

FOREIGN PATENT DOCUMENTS

CN   1271731 C      8/2006
CN   101542779 A    9/2009
(Continued)

OTHER PUBLICATIONS

Aug. 11, 2015, International Search Report issued in the International Patent Application No. PCT/JP2015/002713.
(Continued)

*Primary Examiner* — Haroon S. Sheikh
(74) *Attorney, Agent, or Firm* — Kenja IP Law PC

(57) ABSTRACT

Disclosed is a laminate for non-aqueous secondary battery which includes a water-soluble polymer-containing functional layer and an adhesive layer adjacently disposed on the functional layer, and which can suppress reductions in peel strength of a battery member including the laminate while allowing the functional layer to exert its expected function. The disclosed laminate includes a functional layer containing functional particles and a water-soluble polymer, and an adhesive layer adjacently disposed on the functional layer, wherein a film obtained by shaping of the water-soluble polymer has a water drop contact angle of 30° to 80°.

6 Claims, 1 Drawing Sheet

(51) Int. Cl.
  *H01M 4/139* (2010.01)
  *H01M 4/62* (2006.01)
  *H01M 10/0525* (2010.01)
  *H01M 10/058* (2010.01)

(52) U.S. Cl.
  CPC ........... *H01M 2/1686* (2013.01); *H01M 4/13* (2013.01); *H01M 4/139* (2013.01); *H01M 4/62* (2013.01); *H01M 10/0525* (2013.01); *H01M 10/058* (2013.01)

(56) References Cited

U.S. PATENT DOCUMENTS

| | | | |
|---|---|---|---|
| 2009/0246613 A1 | 10/2009 | Park et al. | |
| 2010/0291430 A1* | 11/2010 | Lee .................... | H01M 2/1646 429/129 |
| 2013/0316219 A1 | 11/2013 | Ha et al. | |
| 2014/0161967 A1 | 6/2014 | Hasegawa et al. | |

FOREIGN PATENT DOCUMENTS

| | | |
|---|---|---|
| CN | 103814459 A | 5/2014 |
| EP | 2680349 A1 | 1/2014 |
| EP | 2897198 A1 | 7/2015 |
| EP | 2924781 A1 | 9/2015 |
| JP | 2001084985 A | 3/2001 |
| JP | 2007273355 A | 10/2007 |
| JP | 2009135104 A | 6/2009 |
| JP | 2012204303 A | 10/2012 |
| WO | 2012115096 A1 | 8/2012 |
| WO | 2013099990 A1 | 7/2013 |
| WO | 2014021401 A1 | 2/2014 |
| WO | 2014041983 A1 | 3/2014 |
| WO | 2014079177 A1 | 5/2014 |
| WO | 2014081035 A1 | 5/2014 |

OTHER PUBLICATIONS

Dec. 27, 2016, International Preliminary Report on Patentability issued in the International Patent Application No. PCT/JP2015/002713.

Charles M. Hansen, "Hansen Solubility Parameters: A User's Handbook, Second Edition", CRC Press, Inc., 2007.

Dec. 6, 2017, Extended European Search Report issued by the European Patent Office in the corresponding European Patent Application No. 15812579.9.

* cited by examiner

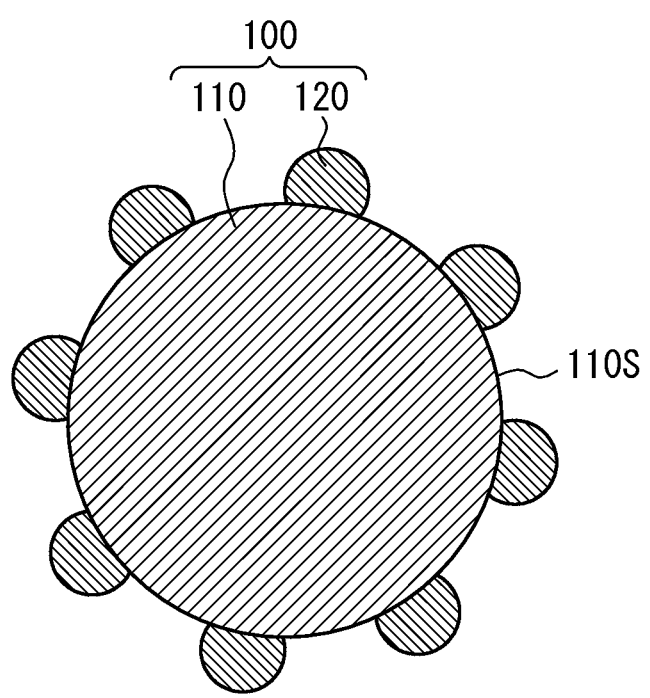

LAMINATE FOR NON-AQUEOUS SECONDARY BATTERY, METHOD OF MANUFACTURING THE SAME, AND NON-AQUEOUS SECONDARY BATTERY

TECHNICAL FIELD

This disclosure relates to a laminate for non-aqueous secondary battery, a method of manufacturing a laminate for non-aqueous secondary battery, and a non-aqueous secondary battery.

BACKGROUND ART

Non-aqueous secondary batteries, such as lithium ion secondary batteries, are small and light, high in energy density, and capable of repeated cycles of charge and discharge. For such characteristics, secondary batteries are used in a wide variety of applications. Therefore, in recent years, various studies have been made to achieve further improvements in the performance of non-aqueous secondary batteries.

Specifically, for example, PTL 1 and other literatures propose a technique of improving electrical characteristics of a non-aqueous secondary battery by integrating together electrodes and separators by bonding with adhesive layers to suppress cell bulging and increases in interelectrode distance which are associated with repeated cycles of charge and discharge.

Exemplary electrodes to be bonded with separators with adhesive layers in non-aqueous secondary batteries such as lithium ion secondary batteries include those prepared by forming an electrode mixed material layer on a current collector, and those prepared by further providing a reinforcing porous membrane layer on the mixed material layer formed on the current collector. Exemplary separators to be bonded to electrodes with adhesive layers include those prepared by providing the surface of a porous separator substrate with a porous membrane layer which is directed to improve heat resistance and strength.

The electrode mixed material layer of an electrode is formed for example by applying onto a current collector an aqueous slurry composition for electrode containing for example electrode active material particles and a water-soluble polymer which exerts thickening and binding effects, and drying the slurry composition for electrode applied. The porous membrane layer provided on the electrode mixed material layer or separator substrate is formed for example by applying onto the electrode mixed material layer or separator substrate an aqueous slurry composition for porous membrane layer containing for example non-conductive particles and a water-soluble polymer which exerts thickening and binding effects, and drying the slurry composition for porous membrane layer applied.

CITATION LIST

Patent Literature

PTL 1: JP 2001-84985 A

SUMMARY

Technical Problem

Recently, from the perspective of reduced environmental loads, etc., it has been proposed to use adhesive layer compositions prepared by dissolving or dispersing adhesives into hydrophilic solvents such as water for the formation of an adhesive layer that provides adhesion between the electrode and separator. Specifically, it has been proposed to apply an adhesive layer composition containing a hydrophilic solvent onto the surface of at least one of an electrode and a separator and dry the adhesive layer composition applied to form an adhesive layer on the surface of the electrode and/or separator.

However, extensive studies by the inventor have revealed that formation of an adhesive layer on an electrode mixed material layer or porous membrane layer, which has been prepared using an aqueous slurry composition containing a water-soluble polymer, by application of an adhesive layer composition containing a hydrophilic solvent raises a concern that battery members (electrode and separator) having the adhesive layer thus formed show reduced peel strength, and further that the functional layer fails to sufficiently exert an expected function. Specifically, it has been revealed that in a laminate for non-aqueous secondary battery which includes a functional layer such as an electrode mixed material layer or porous membrane layer and an adhesive layer disposed adjacently on the functional layer, when the functional layer contains a water-soluble polymer, there is a concern that a battery member which includes the laminate shows reduced peel strength and further that the functional layer shows reduced function.

It would therefore be helpful to provide a laminate for non-aqueous secondary battery which includes a water-soluble polymer-containing functional layer and an adhesive layer adjacently disposed on the functional layer, and which can suppress reductions in the peel strength of a battery member including the laminate while allowing the functional layer to exert an expected function.

It would further be helpful to provide a non-aqueous secondary battery which includes the laminate for non-aqueous secondary battery and has superior electrical characteristics.

The electrode mixed material layer and/or porous membrane layer herein may be referred to as a "functional layer" below. Particles blended in a functional layer in order for the functional layer to exert a desired function (e.g., electrode active material particles when the functional layer is an electrode mixed material layer, or non-conductive particles when the functional layer is a porous membrane layer) may be referred to as "functional particles."

Solution to Problem

The inventor conducted extensive studies to solve the aforementioned problem. The inventor has established that in a laminate for non-aqueous secondary battery which includes a water-soluble polymer-containing functional layer and an adhesive layer adjacently disposed on the functional layer, it is possible to suppress reductions in the peel strength of a battery member including the laminate while allowing the functional layer to exert an expected function, by designing the water-soluble polymer contained in the functional layer to have specific properties. The inventor thus made the products and methods to be disclosed herein.

Specifically, this disclosure is aimed at advantageously solving the aforementioned problem. The laminate for non-aqueous secondary battery disclosed herein includes a functional layer containing functional particles and a water-soluble polymer, and an adhesive layer adjacently disposed on the functional layer, wherein a film obtained by shaping of the water-soluble polymer has a water drop contact angle of 30° to 80°. The use of a water-soluble polymer which when shaped into a film has a water drop contact angle of 30° to 80° in the functional layer as described above makes it possible to suppress reductions in the peel strength of a battery member including a laminate for non-aqueous secondary battery while allowing the functional layer to exert an expected function.

The term "water-soluble polymer" as used herein refers to a polymer that provides no greater than 10% by mass of insoluble content when 0.5 g of the polymer is dissolved into 100 g of water at 25° C. and the solution is adjusted to have a pH of 8.0. Further, "water drop contact angle of a film obtained by shaping of a water-soluble polymer" herein can be obtained by fabricating a 1 cm×1 cm film made of the water-soluble polymer and measuring the contact angle of a water droplet, which is formed by dropping a drop of distilled water on the film, at 23° C. and 50% RH using a contact angle meter. When the functional layer contains two or more different water-soluble polymers, the film used for the measurement of water drop contact angle can be formed of a mixture obtained by blending all the water-soluble polymers contained in the functional layer at the same ratios as their content percentages in the functional layer.

In the laminate for non-aqueous secondary battery disclosed herein, the adhesive layer normally contains a wetting agent.

In the laminate for non-aqueous secondary battery disclosed herein, the adhesive layer contains organic particles, each of which has a core-shell structure having a core and a shell that partially covers the outer surface of the core, wherein the core is preferably made of polymer having a degree of swelling in electrolysis solution of 5 times to 30 times, and the shell is preferably made of polymer having a degree of swelling in electrolysis solution of greater than 1 time to 4 times. A reason for this is that when the organic particles are used in the adhesive layer, it is possible to suppress the occurrence of blocking of the laminate for secondary battery during storage and transportation and to further improve the adhesion of the adhesive layer in electrolysis solution. Another reason is that when such organic particles are used in the adhesive layer, it is possible to allow a non-aqueous secondary battery including the laminate for non-aqueous secondary battery to exert superior electrical characteristics.

The "degree of swelling in electrolysis solution" of the core and shell of an organic particle herein can be measured using the measurement method described in the Examples of this disclosure.

This disclosure is also aimed at advantageously solving the aforementioned problem, and the disclosed method of manufacturing a laminate for non-aqueous secondary battery is a method of manufacturing the laminate for non-aqueous secondary battery described above, wherein the method includes applying an adhesive layer composition containing a hydrophilic solvent onto a surface of a functional layer containing the functional particles and the water-soluble polymer, and drying the adhesive layer composition applied to form an adhesive layer. The use of a water-soluble polymer which when shaped into a film has a water drop contact angle of 30° to 80° in the functional layer as described above makes it possible to suppress, even when an adhesive layer composition containing a hydrophilic solvent has been applied onto a surface of the functional layer to form thereon an adhesive layer, reductions in the peel strength of a battery member including a laminate for non-aqueous secondary battery while allowing the functional layer to exert an expected function.

This disclosure is also aimed at advantageously solving the aforementioned problem, and the non-aqueous secondary battery disclosed herein includes any one of the laminates for non-aqueous secondary battery described above. Thus, using the laminate for non-aqueous secondary battery described above, it is possible to provide a non-aqueous secondary battery which has superior electrical characteristics.

Advantageous Effect

According to this disclosure, it is possible to provide a laminate for non-aqueous secondary battery which includes a water-soluble polymer-containing functional layer and an adhesive layer adjacently disposed on the functional layer, and which can suppress reductions in the peel strength of a battery member including the laminate while allowing the functional layer to exert an expected function.

According to this disclosure, it is also possible to provide a non-aqueous secondary battery which has superior electrical characteristics.

BRIEF DESCRIPTION OF THE DRAWINGS

In the accompanying drawings:
FIG. 1 is a cross-sectional view schematically illustrating a structure of example of an organic particle contained in an adhesive layer of a laminate for non-aqueous secondary battery.

DETAILED DESCRIPTION

Embodiments of this disclosure will now be described in detail.

The laminate for non-aqueous secondary battery disclosed herein may be used as a part of a battery member such as an electrode or a separator, or may be used as a battery member itself. The laminate for non-aqueous secondary battery disclosed herein can be manufactured for example according to the disclosed method of manufacturing a laminate for non-aqueous secondary battery. Further, the non-aqueous secondary battery disclosed herein includes the laminate for non-aqueous secondary battery.

(Laminate for Non-Aqueous Secondary Battery)

The laminate for non-aqueous secondary battery disclosed herein includes a functional layer containing functional particles and a water-soluble polymer, and an adhesive layer adjacently disposed on the functional layer, wherein a film obtained by shaping of the water-soluble polymer contained in the functional layer has a water drop contact angle of 30° to 80°.

When the functional layer is an electrode mixed material layer which contains electrode active material particles as functional particles, the laminate for non-aqueous secondary battery can be provided on a current collector to constitute a part of an electrode.

When the functional layer is a porous membrane layer containing non-conductive particles as functional particles, the laminate for non-aqueous secondary battery can be provided on a porous separator substrate to constitute a part of a separator, can be used as a separator as it is, or can be provided on an electrode mixed material layer of an electrode to constitute a part of the electrode.

The electrode formed using the laminate for non-aqueous secondary battery can be integrated with other battery member(s) such as a separator via the adhesive layer of the laminate. Further, the separator formed using the laminate for non-aqueous secondary battery can be integrated with other battery member(s) such as an electrode via the adhesive layer of the laminate.

<Functional Layer>

The functional layer of a laminate for non-aqueous secondary battery serves as a layer having a function of electron donation and reception, reinforcement or the like in a non-aqueous secondary battery. Examples of the functional layer include electrode mixed material layers which donate and receive electrons via electrochemical reactions, and porous membrane layers for improving heat resistance and strength. The functional layer of the laminate for non-aqueous secondary battery disclosed herein at least contains functional particles for allowing the functional layer to exert an expected function, and a water-soluble polymer, and optionally contains additional additive(s) such as particulate polymers for functional layer.

[Functional Particles]

Examples of functional particles for allowing the functional layer to exert an expected function include electrode active material particles when the functional layer is an electrode mixed material layer, and non-conductive particles when the functional layer is a porous membrane layer.

[[Electrode Active Material Particles]]

Any type of electrode active material particles can be employed. Examples thereof include particles made of electrode active materials known in the art used for non-aqueous secondary batteries. Specifically, any type of electrode active material particles may be used in an electrode mixed material layer of a lithium ion secondary battery, an example of a non-aqueous secondary battery, and particles made of any of the electrode active materials described below can be used.

—Positive Electrode Active Material—

Examples of usable positive electrode active materials to be blended in a positive electrode mixed material layer of the positive electrode of a lithium ion secondary battery include transition metal-containing compounds, such as transition metal oxides, transition metal sulfides, and composite metal oxides comprising lithium and transition metals. Examples of transition metals include Ti, V, Cr, Mn, Fe, Co, Ni, Cu, and Mo.

Specifically, any positive electrode active material can be used. Examples thereof include lithium-containing cobalt oxide ($LiCoO_2$), lithium manganate ($LiMn_2O_4$), lithium-containing nickel oxide ($LiNiO_2$), lithium-containing composite oxides of Co—Ni—Mn, lithium-containing composite oxides of Ni—Mn—Al, lithium-containing composite oxides of Ni—Co—Al, olivine lithium iron phosphate ($LiFePO_4$), olivine lithium manganese phosphate ($LiMnPO_4$), spinel compounds with excess lithium having the formula $Li_{1+x}Mn_{2-x}O_4$ ($0<X<2$), $Li[Ni_{0.17}Li_{0.2}Co_{0.07}Mn_{0.56}]O_2$, and $LiNi_{0.5}Mn_{1.5}O_4$.

The positive electrode active materials described above may be used alone or in combination.

—Negative Electrode Active Material—

Examples of negative electrode active materials to be blended in a negative electrode mixed material layer of the negative electrode of a lithium ion secondary battery include carbon-based negative electrode active materials, metal-based negative electrode active materials, and negative electrode active materials containing any combination thereof.

The carbon-based negative electrode active material herein refers to an active material having a carbon backbone, into which lithium can be inserted (also referred to as "doped"). Specific examples of the carbon-based negative electrode active material include carbonaceous materials such as coke, mesocarbon microbeads (MCMB), mesophase pitch-based carbon fibers, pyrolytic vapor-grown carbon fibers, sintered phenol resins, polyacrylonitrile-based carbon fibers, quasi-isotropic carbon, sintered furfuryl alcohol resins (PFA) and hard carbon, and graphitic materials such as natural graphite and synthetic graphite.

The metal-based negative electrode active material normally refers to an active material that contains metal, the structure of which contains an element into which lithium can be inserted, and that exhibits, when lithium is inserted, a theoretical electric capacity of 500 mAh/g or higher per unit mass. Examples of the metal-based active material include lithium metals; simple substances of metal that can form lithium alloys (e.g., Ag, Al, Ba, Bi, Cu, Ga, Ge, In, Ni, P, Pb, Sb, Si, Sn, Sr, Zn, and Ti); alloys of the simple substances of metal; and oxides, sulfides, nitrides, silicides, carbides, and phosphides of the lithium metals, the simple substances of metal, and the alloys of the simple substances of metal.

The negative electrode active materials described above may be used alone or in combination.

[[Non-Conductive Particles]]

Any type of non-conductive particles can be blended into the porous membrane layer. Examples thereof include non-conductive particles known in the art used for non-aqueous secondary batteries.

Specifically, both inorganic and organic microparticles can be used as non-conductive particles. However, inorganic microparticles are normally used. Among materials of non-conductive particles, such materials are preferred that are present stably in the use environment of non-aqueous secondary batteries and have electrochemical stability. Preferred examples of materials of non-conductive particles from such a perspective include particles of oxides such as aluminum oxide (alumina), hydrated aluminum oxide (boehmite), silicon oxide, magnesium oxide (magnesia), calcium oxide, titanium oxide (titania), $BaTiO_3$, ZrO, and alumina-silica composite oxide; particles of nitrides such as aluminum nitride and boron nitride; particles of covalent crystals such as silicon and diamond; particles of hardly-soluble ionic crystals such as barium sulfate, calcium fluoride and barium fluoride; and microparticles of clays such as talc and montmorillonite. These particles may be subjected to element replacement, surface treatment, solid solution treatment and/or the like where necessary.

The non-conductive particles described above may be used alone or in combination.

The non-conductive particles are preferably spherical particles such as barium sulfate particles or alumina particles. Spherical particles are more easily to be bound to one another in the porous membrane layer compared to flat particles such as boehmite particles. Accordingly, when spherical particles are used to form a porous membrane layer, it is possible to well suppress cell bulging of a non-aqueous secondary battery. Further, porous membrane layers formed using spherical particles have better water draining property (i.e., lesser water content) than those formed using flat particles such as boehmite particles. Accordingly, when spherical particles are used to form a porous membrane layer, it is possible to suppress reductions in electrical characteristic of a non-aqueous secondary battery.

The term "spherical" as used in spherical particles herein refers to a degree of flatness of less than 0.45, and the term "flat" as used in flat particles herein refers to a degree of flatness of 0.45 to less than 1.0. The "degree of flatness" refers to a value obtained using the formula (a−b)/a, where a and b are the long radius and short radius of an ellipse or spheroid, respectively.

[Water-Soluble Polymer]

Water-soluble polymers exert a thickening effect in aqueous slurry compositions for functional layer used for the formation of a functional layer to improve dispersibility of the slurry compositions. Water-soluble polymers may also function as a binder for binding functional particles to one another in the functional layer.

The water-soluble polymer contained in the functional layer of the laminate for non-aqueous secondary battery disclosed herein is required to have a specific water drop contact angle.

—Water Drop Contact Angle—

Specifically, the water-soluble polymer contained in the functional layer is required to be a water-soluble polymer which when shaped into a film has a water drop contact angle of 30° to 80°. The water drop contact angle of a film obtained by shaping of a water-soluble polymer is preferably 40° or more, more preferably 50° or more, preferably 75° or less, more preferably 70° or less, and still more preferably 60° or less. In the case where a film obtained by shaping of a water-soluble polymer has a water drop contact angle that falls outside the above-described range, when an adhesive layer composition containing a hydrophilic solvent is applied onto a functional layer to form an adhesive layer, a battery member including a laminate for non-aqueous secondary battery shows reduced peel strength and the functional layer fails to sufficiently exert an expected function.

Although it remains elusive why it is possible to suppress reductions in the function of the functional layer and peel strength of a battery member including a laminate for non-aqueous secondary battery by setting the water drop contact angle of a film obtained by shaping of a water-soluble polymer to fall within the above-described range, the reason is presumed to be as follows.

Specifically, when forming an adhesive layer by applying onto a functional layer an adhesive layer composition containing a hydrophilic solvent, there is a concern that the water-soluble polymer in the functional layer is re-dissolved upon application of the adhesive layer composition to disrupt the structure of the functional layer once formed, resulting in reduced peel strength of the battery member and reduced function of the functional layer. However, when a water-soluble polymer is used which when shaped into a film has a water drop contact angle of 30° or more, it is possible to suppress re-dissolution of the water-soluble polymer upon application of the adhesive layer composition and therefore reductions in the peel strength of the battery member and the function of the functional layer can be suppressed. Further, when a water-soluble polymer is used which when shaped into a film has a water drop contact angle of 80° or less, it is possible to suppress reductions in the dispersibility of an aqueous slurry composition for functional layer used for the formation of a functional layer due to reduced solubility of the water-soluble polymer in the aqueous slurry composition. Accordingly, it is possible to ensure that the functional layer formed using the slurry composition for functional layer exerts a sufficient function (e.g., strength) and to suppress reductions in peel strength.

—Composition of Water-Soluble Polymer—

The water drop contact angle of a film obtained by shaping of a water-soluble polymer can be adjusted for example by changing the type and/or composition of the water-soluble polymer. Any water-soluble polymer can be used which when shaped into a film has a water drop contact angle of 30° to 80°; examples thereof include thickening polysaccharides such as xanthan gum; polystyrene sulfonic acid; and copolymers containing a (meth)acrylic acid ester monomer unit, an acid group-containing monomer unit, and a cross-linkable monomer unit. Of these water-soluble polymers, from the perspective of improving the strength of the functional layer to suppress cell bulging to improve electrical characteristics of a secondary battery, the water-soluble polymer is preferably a copolymer containing a (meth)acrylic acid ester monomer unit, an acid group-containing monomer unit, and a cross-linkable monomer unit.

The phrase "containing . . . monomer unit" as used herein means that "a polymer obtained with a monomer contains a structural unit derived from the monomer". Further, "(meth)acrylic acid" refers to acrylic acid and/or methacrylic acid.

Examples of (meth)acrylic acid ester monomers that may form the (meth)acrylic acid ester monomer unit of the copolymer include acrylic acid alkyl esters, such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters, such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. These monomers may be used alone or in combination at any ratio.

Of these (meth)acrylic acid ester monomers, it is preferable to use acrylic acid alkyl esters, more preferably ethyl acrylate and butyl acrylate, and it is preferable to use ethyl acrylate and butyl acrylate in combination.

When ethyl acrylate and butyl acrylate are used in combination as the (meth)acrylic acid ester monomers, the percentage of a unit derived from ethyl acrylate (ethyl acrylate unit) in the copolymer is preferably 1 time or more, more preferably 2 times or more, still more preferably 3 times or more, and particularly preferably 4 times or more the percentage of a unit derived from butyl acrylate (butyl acrylate unit) in the copolymer. The percentage of the ethyl acrylate unit in the copolymer is preferably 10 times or less, more preferably 7 times or less, and still more preferably 6 times or less the percentage of the butyl acrylate unit in the copolymer.

The percentage of the (meth)acrylic acid ester monomer unit in the copolymer is preferably 30% by mass or more, more preferably 50% by mass or more, preferably 90% by mass or less, and more preferably 80% by mass or less. When the percentage of the (meth)acrylic acid ester monomer unit is too low, there is a concern that the film's water drop contact angle becomes small resulting in failure to sufficiently suppress re-dissolution of the water-soluble polymer. When the percentage of the (meth)acrylic acid ester monomer unit is too high, there is a concern that the film's water drop contact angle becomes large to cause reductions in the dispersibility of the slurry composition resulting in failure to obtain a functional layer with a sufficient strength.

Examples of acid group-containing monomers that may form the acid group-containing monomer unit of the copolymer include carboxylic acid group-containing monomers, sulfonate group-containing monomers, phosphate group-containing monomers, and hydroxyl group-containing monomers.

Examples of the carboxylic acid group-containing monomers include monocarboxylic acids and dicarboxylic acids. Examples of the monocarboxylic acids include acrylic acid, methacrylic acid, and crotonic acid. Examples of dicarboxylic acids include maleic acid, fumaric acid, and itaconic acid.

Examples of the sulfonate group-containing monomers include vinyl sulfonic acid, methylvinyl sulfonic acid, (meth)allyl sulfonic acid, styrene sulfonic acid, (meth)acrylic acid-2-ethyl sulfonate, 2-acrylamide-2-methyl propane sulfonic acid, and 3-allyloxy-2-hydroxypropane sulfonic acid. The term "(meth)allyl" as used herein means allyl and/or methallyl.

Examples of the phosphate group-containing monomers include 2-(meth)acryloyloxyethyl phosphate, methyl-2-(meth)acryloyloxyethyl phosphate, and ethyl-(meth)acryloyloxyethyl phosphate. The term "(meth)acryloyl" as used herein refers to "acryloyl and/or methacryloyl".

Examples of the hydroxyl group-containing monomers include 2-hydroxyethyl acrylate, 2-hydroxypropyl acrylate, 2-hydroxyethyl methacrylate, and 2-hydroxypropyl methacrylate.

These monomers may be used alone or in combination at any ratio.

Of these acid group-containing monomers, carboxylic acid group-containing monomers are preferable, with monocarboxylic acids being more preferable, and (meth)acrylic acid being still more preferable.

The percentage of the acid group-containing monomer unit in the copolymer is preferably 20% by mass or more, more preferably 22% by mass or more, still more preferably 25% by mass or more, preferably 70% by mass or less, more preferably 60% by mass or less, and still more preferably 50% by mass or less. When the percentage of the acid group-containing monomer unit is too low, there is a concern that the film's water drop contact angle becomes large to cause reductions in the dispersibility of the slurry composition resulting in failure to obtain a functional layer having sufficient strength. When the percentage of the acid group-containing monomer unit is too high, the copolymer's strength increases but there is a concern that the film's water drop contact angle becomes small resulting in failure to sufficiently suppress re-dissolution of the water-soluble polymer. Further, when the percentage of the acid group-containing monomer unit is too high, there is a concern that a secondary battery exhibits poor rate characteristics.

Examples of cross-linkable monomers that may form the cross-linkable monomer unit in the copolymer include those monomers that may form a cross-linked structure during or after polymerization by heating or by irradiation with energy beams.

Specific examples of the cross-linkable monomers include multi-functional monomers having two or more polymerizable groups in the monomers. Examples of such multi-functional monomers include divinyl compounds such as divinyl benzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylol propane trimethacrylate, and trimethylol propane triacrylate; and epoxy group-containing ethylenically unsaturated monomers such as allyl glycidyl ether, and glycidyl methacrylate. These monomers may be used alone or in combination at any ratio.

Of these cross-linkable monomers, preferred are di(meth)acrylic acid ester compounds, with ethylene glycol dimethacrylate being more preferable.

The percentage of the cross-linkable monomer unit in the copolymer is preferably 0.1% by mass or more, more preferably 0.5% by mass or more, preferably 5% by mass or less, more preferably 3% by mass or less, and still more preferably 1.5% by mass or less. When the percentage of the cross-linkable monomer unit is too low, there is a concern that a functional film with sufficient strength cannot be obtained. When the percentage of the cross-linkable monomer unit is too high, there is a concern that the film's water drop contact angle becomes large to cause reductions in the dispersibility of the slurry composition.

The copolymer is produced for example by polymerizing a monomer composition containing the monomers described above in aqueous solvent. The content percentage of each monomer in the monomer composition is normally made the same as that of the repeating unit in the desired copolymer.

Any mode of polymerization can be used allowing any polymerization method to be usable, such as solution polymerization, suspension polymerization, bulk polymerization and emulsion polymerization. Also, any polymerization reaction can be used, such as ionic polymerization, radical polymerization, or living radical polymerization. Upon polymerization, any of the emulsifiers and/or polymerization initiators known in the art can be used where necessary.

The water-soluble polymer to be blended into a functional layer may be such a water-soluble polymer that results in a film having a water drop contact angle of 30° to 80°, the film being formed of a mixture obtained by blending all the water-soluble polymers contained in the functional layer at the same ratios as their content percentages in the functional layer. Specifically, the functional layer may contain a water-soluble polymer which when shaped into a film alone has a water drop contact angle of less than 30° or greater than 80°.

—Water-Soluble Polymer Content—

The water-soluble polymer content in the functional layer is preferably 0.1 parts by mass or more, more preferably 0.5 parts by mass or more, still more preferably 1 part by mass or more, preferably 10 parts by mass or less, more preferably 5 parts by mass or less, and still more preferably 2 parts by mass or less per 100 parts by mass of functional particles. When the water-soluble polymer is contained in an amount of 0.1 parts by mass or more per 100 parts by mass of functional particles, it is possible to sufficiently improve the dispersibility of the slurry composition for functional layer and to increase the binding ability and strength of the functional layer. When the water-soluble polymer is contained in an amount of 10 parts by mass or less per 100 parts by mass of functional particles, it is possible to suppress reductions in electrical characteristics of a non-aqueous secondary battery such as rate characteristics and cycle characteristics due to increased internal resistance of the functional layer.

[Additional Additives]

Examples of additional additives which may be contained in the functional layer in addition to the functional particles and water-soluble polymer described above include, in addition to particulate polymers for functional layer which function as a binder, additives known in the art such as leveling agents (wetting agents) and additives for electrolysis solution. When the functional layer is an electrode mixed material layer, examples of additional additives also include conductive materials. Any of the additives known in the art can be used as long as they do not affect the battery reaction.

For example, additives described in WO2012/115096A may be used. These additives may be used alone or in combination at any ratio.

[[Particulate Polymer for Functional Layer]]

Examples of particulate polymers for functional layer include water-insoluble, water-dispersible particulate polymers known in the art. Specific examples thereof include diene polymers such as styrene-butadiene copolymers and acrylonitrile-butadiene copolymers; acrylic polymers; fluoropolymers; and silicone polymers. These particulate polymers may be used alone or in combination.

The term "water-insoluble polymer" as used herein refers to a polymer that provides at least 80% by mass of insoluble content when 0.5 g of the polymer is dissolved into 100 g of water at 25° C.

The particulate polymer content in the functional layer is preferably 0.1 parts by mass or more, more preferably 0.2 parts by mass or more, preferably 15 parts by mass or less, and more preferably 10 parts by mass or less per 100 parts by mass of functional particles. When the particulate polymer for functional layer is contained in an amount of 0.1 parts by mass or more per 100 parts by mass of functional particles, it is possible to ensure sufficient binding capacity and thus to sufficiently prevent the functional particles and the like from coming off the functional layer. When the particulate polymer for functional layer is contained in an amount of 15 parts by mass or less per 100 parts by mass of functional particles, it is possible to suppress reductions in electrical characteristics of a non-aqueous secondary battery such as rate characteristics due to increased internal resistance of the functional layer.

<Method of Forming Functional Layer>

The functional layer containing the components described above can be prepared using a slurry composition for functional layer, which is obtained by dissolving or dispersing these components in a hydrophilic solvent as dispersion medium. Specifically, the functional layer can be formed for example by applying the slurry composition for functional layer onto a substrate and drying the slurry composition applied.

[Hydrophilic Solvent]

Examples of the hydrophilic solvent include water; ketones such as diacetone alcohol and γ-butyrolactone; alcohols such as ethyl alcohol, isopropyl alcohol, and normal propyl alcohol; glycol ethers such as propylene glycol monomethyl ether, methyl cellosolve, ethyl cellosolve, ethylene glycol tert-butyl ether, butyl cellosolve, 3-methoxy-3-methyl-1-butanol, ethylene glycol monopropyl ether, diethylene glycol monobutyl ether, triethylene glycol monobutyl ether, and dipropylene glycol monomethyl ether; and ethers such as 1,3-dioxolane, 1,4-dioxolane, and tetrahydrofuran. It may be possible to use water as the main solvent, with the hydrophilic solvent(s) described above other than water being mixed within an extent that can ensure that the components described above remain dissolved or dispersed therein.

[Preparation of Slurry Composition for Functional Layer]

The slurry composition for functional layer can be prepared by dispersing the components described above in a hydrophilic solvent as dispersion medium. Specifically, the slurry composition for functional layer can be prepared by mixing the components described above and a hydrophilic solvent with a mixer such as ball mill, sand mill, bead mill, pigment disperser, grinding machine, ultrasonic disperser, homogenizer, planetary mixer, or FILMIX.

From the perspective of improving electrical characteristics of a non-aqueous secondary battery including a laminate for non-aqueous secondary battery, the pH of the slurry composition for functional layer is preferably adjusted to 7 to 11, and more preferably 7 to 10. Adjustment of the pH of the slurry composition for functional layer can be accomplished by the addition of any alkaline compound known in the art such as sodium hydroxide or ammonia, with ammonia being preferable.

[Substrate]

The substrate on which the slurry composition for functional layer is to be applied can be appropriately selected according to the type of the functional layer.

Specifically, when the functional layer is an electrode mixed material layer, any current collector known in the art can be used. The current collector may be made of material having electrical conductivity as well as electrochemical durability. Specifically, a current collector made of iron, copper, aluminum, nickel, stainless steel, titanium, tantalum, gold, platinum or the like may be used. When the functional layer is a negative electrode mixed material layer, copper foil is particularly preferable as the current collector. When the functional layer is a positive electrode mixed material layer, aluminum foil is particularly preferable as the current collector. These materials may be used alone or in combination at any ratio.

When the functional layer is a porous membrane layer, as the substrate, it is possible to use, for example, a separator substrate, an electrode mixed material layer formed on a current collector, a releasable substrate depending on the place where the porous membrane layer is to be formed. More specifically, when a laminate for non-aqueous secondary battery having a porous membrane layer is provided on a separator substrate for use as a separator, it is possible to use, as the substrate, any porous separator substrate known in the art. When the laminate for non-aqueous secondary battery having a porous membrane layer is to be provided on an electrode mixed material layer of an electrode for use as a part of the electrode, it is possible to use, as the substrate, an electrode mixed material layer formed on a current collector. Further, when the laminate for non-aqueous secondary battery having a porous membrane layer is to be used as a separator as it is, it is possible to use, as the substrate, any known releasable substrate or the like which can be easily peeled and removed from the laminate.

[Application and Drying of Slurry Composition for Functional Layer]

The slurry composition for functional layer can be applied onto a substrate by any method known in the art. Specifically, the slurry composition may be applied for example by doctor blading, dip coating, reverse roll coating, direct roll coating, gravure coating, extrusion coating, or brush coating. The thickness of the slurry film on the substrate after application and prior to drying may be appropriately set according to the thickness of the functional layer to be obtained by drying.

The slurry composition for functional layer applied on the substrate can be dried by any method known in the art, e.g., drying by warm, hot, or low-humidity air; vacuum drying; or drying by irradiation with infrared light or electron beams.

After drying the slurry composition for functional layer, the resultant functional layer may be subjected to press treatment using a mold press, roll press or the like. Press treatment can increase close adhesion between the functional layer and substrate. Furthermore, when the functional layer contains a curable polymer, the polymer is preferably cured after formation of the functional layer.

\<Adhesive Layer\>

The adhesive layer of a laminate for non-aqueous secondary battery is a layer used in a non-aqueous secondary battery to integrate together a battery member including the laminate for non-aqueous secondary battery and other battery member(s) by bonding. The adhesive layer of the laminate for non-aqueous secondary battery disclosed herein contains at least an adhesive, and optionally contains additional agent(s) such as wetting agents.

[Adhesive]

Any adhesive known in the art can be used which is used in non-aqueous secondary batteries. In particular, as an adhesive, it is preferable to use specific organic particles which will be described below in detail. It is further preferable to use the organic particles described below and a particulate polymer for adhesive layer in combination.

[[Organic Particles]]

Organic particles which may be suitably used as an adhesive each has a core-shell structure having a core and a shell that partially covers the outer surface of the core, wherein the core is made of polymer having a degree of swelling in electrolysis solution of 5 times to 30 times, and the shell is made of polymer having a degree of swelling in electrolysis solution of greater than 1 time to 4 times.

Organic particles having the structure and properties described above can exert superior adhesion in electrolysis solution to well improve electrical characteristics of a non-aqueous secondary battery having an adhesive layer. Further, using the organic particles, it is possible to suppress increases in internal resistance of a non-aqueous secondary battery provided with a laminate for non-aqueous secondary battery having an adhesive layer, so that reductions in rate characteristics can be suppressed. There are cases wherein battery members that include a laminate for non-aqueous secondary battery are stored and transported in a spirally wound form. Battery members having on their surface an adhesive layer containing such organic particles are less likely to undergo blocking (gluing of battery members to one another via adhesive layers) even when spirally wound and therefore are superior in handleability.

Although it remains elusive why the organic particles result in a superior effect such as that described above, the reason is presumed to be as follows.

Specifically, the shell polymer of the organic particle swells in contact with electrolysis solution. At this time, for example, activation of the functional groups on the swollen shell polymer followed by chemical or electrical interactions of these functional groups with functional groups present on the surface of a battery member (e.g., separator, electrode) allows the shell to be firmly bound to the battery member. Thus, it is presumed that an adhesive containing the organic particles provides firm adhesion between battery members in electrolysis solution. For such a reason, it is also presumed that when an adhesive layer containing the organic particles is provided between a separator and an electrode, the adhesive layer can provide firm adhesion between the separator and the electrode in electrolysis solution.

Further, since the use of an adhesion layer containing the organic particles can provide firm adhesion between a separator and an electrode in electrolysis solution as described above, in a secondary battery including such an adhesive layer, space is not easily formed between the battery members (e.g., between separator and electrode) bonded together with the adhesive layer. Thus, in a secondary battery including an adhesive layer containing the organic particles, the distance between the positive and negative electrodes does not easily increase, so that the internal resistance of the secondary battery can be lowered and that the reaction field of electrochemical reactions in the electrode does not easily become non-uniform. Further, in the secondary battery, space is not easily formed between the separator and electrode even after repeated cycles of charge and discharge, and thus the battery capacity does not easily decreases. It is assumed that this achieves superior electrical characteristics (e.g., rate characteristics and high-temperature cycle characteristics).

Further, the core polymer of the organic particle greatly swells in contact with electrolysis solution. With the polymer greatly swollen in electrolysis solution, intermolecular space of the polymer becomes large allowing ions to easily pass through between the molecules. Also, the core polymer of the organic particle is not completely covered with the shell. Thus, ions are more likely to pass through the core in electrolysis solution, and therefore the organic particles can exert high ion diffusivity. Accordingly, using the organic particles, it is possible to suppress increases in resistance due to the adhesive layer to suppress reductions in rate characteristics.

When not swollen in electrolysis solution, the shell polymer does not generally exhibit adhesion but does so only after swollen in electrolysis solution. For this reason, the organic particles do not generally exert adhesion when they are not swollen in electrolysis solution. The adhesive layer containing the organic particles therefore does not exert great adhesion when not swollen in electrolysis solution, and it is assumed that the laminate for non-aqueous secondary battery disclosed herein provided with the adhesive layer does not easily undergo blocking even when stacked. It is not that the organic particles do not exert adhesion at all as long as they do not swell in contact with electrolysis solution; they may exert adhesion when, for example, heated to a given temperature or higher (e.g., 50° C. or higher) even when not swollen in electrolysis solution.

—Structure of Organic Particle—

Each organic particle has a core-shell structure having a core and a shell that covers the outer surface of the core. The shell partially covers the outer surface of the core. Specifically, although the shell of the organic particle covers the outer surface of the core, it does not cover the entire outer surface of the core. Even when the core outer surface seems to be completely covered by a shell by its appearance, the shell is equated to a shell that partially covers the core outer surface in cases where the shell has a pore that communicates between inside and outside of the shell. Accordingly, the above-described organic particles encompass, for example, such organic particles with a shell having a fine pore that communicates from the shell outer surface (i.e., peripheral surface of the organic particle) to the core outer surface.

Specifically, referring to FIG. 1 which illustrates a cross-sectional structure of an example of an organic particle, an organic particle 100 has a core-shell structure having a core 110 and a shell 120. The core 110 refers to a portion which is present inward from the shell 120 in the organic particle 100. The shell 120 refers to a portion which covers an outer surface 110S of the core 110, and normally refers to an outermost portion of the organic particle 100. The shell 120 does not cover the entire outer surface 110S of the core 110, but partially covers the outer surface 110S of the core 110.

In the organic particle, the average ratio of shell coverage on the core outer surface is preferably 10% or more, more preferably 30% or more, still more preferably 40% or more, particularly preferably 60% or more, preferably 99.9% or less, more preferably 99% or less, still more preferably 95% or less, yet more preferably 90% or less, and particularly preferably 85% or less. By setting the average ratio of shell coverage on the core outer surface to fall within the above-described range, it is possible to establish a good balance between ion diffusivity and adhesion of the adhesive layer.

The average ratio of shell coverage on the core outer surface may be measured by the observation of the cross-sectional structures of organic particles. Specifically, measurements may be made by the method described below.

First, organic particles are fully dispersed in room temperature-curable epoxy resin and then embedded to form a block piece containing the organic particles. A thin slice of 80-200 nm thickness is then cut from the block piece using a microtome equipped with a diamond blade to prepare a measurement specimen. Thereafter, where necessary, the measurement specimen is subjected to dying treatment using, for example, ruthenium tetroxide or osmium tetroxide.

The measurement specimen is then loaded into a transmission electron microscope (TEM), and an image of cross-sectional structures of the organic particles is captured. The magnification of the electron microscope is preferably such that a cross-section of one organic particle is within the field of view. Specifically, the magnification is preferably on the order of 10,000×.

In the cross-sectional structure of a captured organic particle image, length D1 (circumferential length of core, corresponding to the core outer surface) and length D2 (length of a part where the core outer surface contacts the shell) are measured. Using lengths D1 and D2 measured, the ratio of shell coverage on the core outer surface of that organic particle (Rc) is calculated using the following Equation (1):

Ratio of coverage Rc (%)=(D2/D1)×100    (1)

The ratio of coverage (Rc) is measured for 20 or more organic particles, and an average the measured ratios of coverage is calculated to find an average ratio of shell coverage on the core outer surface.

Although the ratio of coverage (Rc) can be calculated manually based on cross-sectional structures of organic particles, calculation can be made using commercially available image analysis software. For example, "AnalySIS Pro" (Olympus Corporation) can be used as such commercially available image analysis software.

The organic particles preferably have a volume-average particle diameter of 0.01 μm or more, more preferably 0.1 μm or more, still more preferably 0.3 μm or more, preferably 10 μm or less, more preferably 5 μm or less, and still more preferably 1 μm or less. By setting the volume-average particle diameter of the organic particles to be at least the lower limit value of the above-described range, it is possible to increase the adhesion of the adhesive layer. Further, by setting the volume-average particle diameter to be no greater than the upper limit value of the range, it is possible to improve rate characteristics of a secondary battery.

The organic particles may each have optional component(s) other than the core and shell as long as such component(s) do not significantly compromise expected effects. Specifically, for example, the organic particle may have inside the core a portion made of different polymer than the core. By way of specific example, seed particles which were used when producing the organic particles by seed polymerization may remain inside the core. However, from the perspective that the organic particles can exert significant levels of expected effects, the organic particles preferably have only a core and a shell.

—Core—

The core of the organic particle is made of polymer having a specific degree of swelling in electrolysis solution. Specifically, the core polymer normally has a degree of swelling in electrolysis solution of 5 times or more, preferably 6 times or more, and more preferably 7 times or more, and normally has a degree of swelling in electrolysis solution of 30 times or less, preferably 25 times or less, more preferably 20 times or less, and still more preferably 15 times or less. By setting the degree of swelling in electrolysis solution of the core polymer to fall within the above-described range, it is possible to increase ion diffusivity of the adhesive layer and thus to improve rate characteristics of a non-aqueous secondary battery and also well improve its electrical characteristics such as cycle characteristics. By setting the degree of swelling in electrolysis solution of the core polymer to be at least the lower limit value of the range, it is possible to improve rate characteristics. Further, by setting the degree of swelling in electrolysis solution to be no greater than the upper limit value of the range, it is possible to increase adhesion of the adhesive layer in electrolysis solution and also well improve electrical characteristics of a non-aqueous secondary battery such as cycle characteristics.

The electrolysis solution used for the measurement of the degree of swelling in electrolysis solution of the core polymer can be a solution which is obtained by dissolving supporting electrolyte $LiPF_6$ into a mixture solvent of ethylene carbonate, diethyl carbonate and vinylene carbonate (mixing ratio: ethylene carbonate/diethyl carbonate/vinylene carbonate=68.5/30/1.5 (by volume), SP value: 12.7 $(cal/cm^3)^{1/2}$) at a concentration of 1 mol/L.

The degree of swelling in electrolysis solution of the core polymer can be measured in a manner as specifically described below.

A polymer for the core of the organic particles is first prepared. For example, a polymer is prepared which was obtained by a process similar to that used for the production of the core in the production method of the organic particles. A film is fabricated using the polymer thus prepared. For example, when the polymer is solid, it is dried at 25° C. for 48 hours and then shaped into a 0.5 mm thick film. Alternatively, when the polymer is solution or dispersion liquid such as latex, the solution or dispersion liquid is placed into a polytetrafluoroethylene petri dish and dried at 25° C. for 48 hours to prepare a 0.5 mm thick film.

Next, the film prepared as described above is cut into a 1 cm×1 cm square sheet to provide a test specimen. The weight (W0) of the test specimen is measured. Further, the test specimen is immersed into the electrolysis solution described above at 60° C. for 72 hours and taken out from the electrolysis solution. The electrolysis solution on the surface of the test specimen is wiped off, and the weight (W1) of the test specimen after immersion is measured.

Using weights W0 and W1, the degree of swelling S (fold) is calculated using the equation S=W1/W0.

An exemplary method of adjusting the degree of swelling in electrolysis solution of the core polymer is to properly select the type and amount of a monomer used for the production of the core polymer in consideration of the SP value of the electrolysis solution. In general, when a polymer has an SP value close to that of electrolysis solution, the polymer tends to swell in the electrolysis solution. On the other hand, when a polymer has an SP value far from that of electrolysis solution, the polymer tends to be less likely to swell in the electrolysis solution.

The SP value as used herein means a solubility parameter.

The SP value can be calculated using the method introduced in "Hansen Solubility Parameters A User's Handbook, 2nd Ed (CRCPress)".

Further, an SP value of an organic compound can be estimated based on the molecular structure of the organic compound. Specifically, SP values may be calculated using simulation software capable of calculation of SP values using the SMILE equation (e.g., "HSPiP" (http=//www.hansen-solubility.com)). In this simulation software, SP values are calculated based on the theory described in "Hansen SOLUBILITY PARAMETERS A User's Handbook Second Edition, Charles M. Hansen".

The monomer used for the production of the core polymer may be appropriately selected from those that provide polymers whose degree of swelling in electrolysis solution falls within the above-described range. Examples of such monomers include vinyl chloride-based monomers such as vinyl chloride and vinylidene chloride; vinyl acetate-based monomers such as vinyl acetate; aromatic vinyl monomers such as styrene, α-methylstyrene, styrene sulfonic acid, butoxystyrene, and vinylnaphthalene; vinylamine-based monomers such as vinylamine; vinylamide-based monomers such as N-vinylformamide and N-vinylacetamide; acid group-containing monomers such as carboxyl group-containing monomers, sulfonate group-containing monomers, phosphate group-containing monomers, and hydroxyl group-containing monomers; (meth)acrylic acid derivatives such as 2-hydroxyethyl methacrylate; (meth)acrylic acid ester monomers such as methyl acrylate, ethyl acrylate, methyl methacrylate, ethyl methacrylate, and 2-ethylhexyl acrylate; (meth)acrylamide monomers such as acrylamide and methacrylamide; (meth)acrylonitrile monomers such as acrylonitrile and methacrylonitrile; fluorine-containing (meth)acrylate monomers such as 2-(perfluorohexyl)ethyl methacrylate and 2-(perfluorobutyl)ethyl acrylate; maleimide; maleimide derivatives such as phenylmaleimide; and diene-based monomers such as 1,3-butadiene and isoprene. These monomers may be used alone or in combination at any ratio.

Of these monomers, preferred for the production of the core polymer are (meth)acrylic acid ester monomers and (meth)acrylonitrile monomers. Specifically, the core polymer preferably contains a (meth)acrylic acid ester monomer unit or a (meth)acrylonitrile monomer unit. The core polymer may contain only a (meth)acrylic acid ester monomer unit or a (meth)acrylonitrile monomer unit, or may contain both in combination. This not only makes it easy to control the degree of swelling of polymer, but can further increase ion diffusivity of an adhesive layer containing the organic particles.

The total percentage of the (meth)acrylic acid ester monomer unit and the (meth)acrylonitrile monomer unit in the core polymer is preferably 50% by mass or more, more preferably 55% by mass or more, still more preferably 60% by mass or more, particularly preferably 70% by mass or more, preferably 100% by mass or less, more preferably 99% by mass or less, still more preferably 95% by mass or less, and particularly preferably 90% by mass or less. By setting the total percentage of the (meth)acrylic acid ester monomer unit and the (meth)acrylonitrile monomer unit to fall within the above-described range, the degree of swelling in electrolysis solution of the organic particles can be easily set to fall within the above-described range. Further, it is possible to increase ion diffusivity of the adhesion layer, and further to improve rate characteristic of a secondary battery.

The core polymer may contain an acid group-containing monomer unit. Examples of acid group-containing monomers include monomers having an acid group, such as carboxyl group-containing monomers, sulfonate group-containing monomers, phosphate group-containing monomers, and hydroxyl group-containing monomers.

Examples of the carboxylic acid group-containing monomers include monocarboxylic acids and dicarboxylic acids. Examples of the monocarboxylic acids include acrylic acid, methacrylic acid, and crotonic acid. Examples of the dicarboxylic acids include maleic acid, fumaric acid, and itaconic acid.

Examples of the sulfonate group-containing monomers include vinyl sulfonic acid, methylvinyl sulfonic acid, (meth)allyl sulfonic acid, (meth)acrylic acid-2-ethyl sulfonate, 2-acrylamide-2-methyl propane sulfonic acid, and 3-allyloxy-2-hydroxypropane sulfonic acid.

Examples of the phosphate group-containing monomers include 2-(meth)acryloyloxyethyl phosphate, methyl-2-(meth)acryloyloxyethyl phosphate, and ethyl-(meth) acryloyloxyethyl phosphate.

Examples of the hydroxyl group-containing monomers include 2-hydroxyethyl acrylate, 2-hydroxypropyl acrylate, 2-hydroxyethyl methacrylate, and 2-hydroxypropyl methacrylate.

Of these acid group-containing monomers, carboxylic acid group-containing monomers are preferred, with monocarboxylic acids being more preferable, and (meth)acrylic acid being still more preferable.

These acid group-containing monomers may be used alone or in combination at any ratio.

The percentage of the acid group-containing monomer unit in the core polymer is preferably 0.1% by mass or more, more preferably 1% by mass or more, still more preferably 3% by mass or more, preferably 20% by mass or less, more preferably 10% by mass or less, and still more preferably 7% by mass or less. By setting the percentage of the acid group-containing monomer unit to fall within the above-described range, it is possible to increase dispersibility of the core polymer during preparation of organic particles, enabling a shell that partially covers the core outer surface to be easily formed on the core outer surface.

The core polymer preferably contains a cross-linkable monomer unit in addition to the monomer units described above. A cross-linkable monomer refers to a monomer that may form a cross-linked structure during or after polymerization by heating or by irradiation with energy beams. When the core polymer contains a cross-linkable monomer unit, the degree of swelling of the polymer can be easily set to fall within the above-described range.

Examples of the cross-linkable monomers include multi-functional monomers having two or more polymerizable groups in the monomers. Examples of such multi-functional monomers include divinyl compounds such as divinyl benzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylol propane trimethacrylate, and trimethylol propane triacrylate; and epoxy group-containing ethylenically unsaturated monomers such as allyl glycidyl ether, and glycidyl methacrylate. Of these monomers, from the perspective of easy control of the degree of swelling in electrolysis solution of the core polymer, dimethacrylic acid ester compounds and epoxy group-containing ethylenically unsaturated monomers are preferable, with dimethacrylic acid ester compounds being more preferable. These cross-linkable monomers may be used alone or in combination at any ratio.

In general, the degree of swelling in electrolysis solution of a polymer tends to decrease with increasing percentage of a cross-linkable monomer unit in that polymer. Accordingly, it is preferable to determine the percentage of a cross-linkable monomer unit in consideration of the type and amount of monomers used. The specific percentage of the cross-linkable monomer unit in the core polymer is preferably 0.1% by mass or more, more preferably 0.2% by mass or more, still more preferably 0.5% by mass or more, particularly preferably 1% by mass or more, preferably 5% by mass or less, more preferably 4% by mass or less, still more preferably 3% by mass or less, and particularly preferably 2% by mass or less. By setting the percentage of the cross-linkable monomer unit to be at least the lower limit value of the above-described range, it is possible to increase adhesion of the adhesive layer. Further, by setting the percentage of the cross-linkable monomer unit to be no greater than the upper limit value of the above-described range, it is possible to prolong the life of a secondary battery.

The core polymer preferably has a glass-transition temperature of 0° C. or higher, more preferably 10° C. or higher, still more preferably 20° C. or higher, yet more preferably 30° C. or higher, particularly preferably 60° C. or higher, preferably 150° C. or below, more preferably 130° C. or below, still more preferably 110° C. or below, yet more preferably 100° C. or below, and particularly preferably 95° C. or below. By setting the glass-transition temperature of the core polymer to be at least the lower limit value of the above-described range, it is possible to increase adhesion of the adhesive layer. Further, by setting the glass-transition temperature of the core polymer to be no greater than the upper limit value of the above-described range, it is possible to prolong the life of a secondary battery. By setting the glass-transition temperature of the core polymer to fall within the above-described range, it is further possible to improve rate characteristics of a secondary battery. The glass-transition temperature can be measured in accordance with JIS K7121.

The core diameter is preferably 50% or more, more preferably 60% or more, still more preferably 70% or more, particularly preferably 80% or more, preferably 99% or less, more preferably 98.5% or less, and still more preferably 98% or less, with respect to the volume-average particle diameter of the organic particles (100%). By setting the core diameter to be at least the lower limit value of the above-described range, it is possible to increase ion conductivity. By setting the core diameter to be no greater than the upper limit value of the above-described range, it is possible to increase adhesion of the adhesive layer.

The core diameter can be measured as a volume-average particle diameter of a particulate polymer prior to shell formation, which is obtained in the production process of organic particles. Such a particulate polymer prior to shell formation corresponds to a particulate core polymer. "Volume-average particle diameter" refers to a particle diameter where the cumulative volume from the fine side amounts to 50% of the entire volume in a particle size distribution measured by laser diffraction.

—Shell—

The shell of the organic particle is made of polymer having a specific a degree of swelling in electrolysis solution which is smaller than that of the core. Specifically, the shell polymer normally has a degree of swelling in electrolysis solution of greater than 1 time, preferably 1.05 times or more, more preferably 1.1 times or more, and still more preferably 1.2 times or more, and normally has a degree of swelling in electrolysis solution of 4 times or less, preferably 3.5 times or less, and more preferably 3 times or less. By setting the degree of swelling in electrolysis solution of the shell polymer to fall within the above-described range, it is possible to increase adhesion of the adhesive layer in electrolysis solution. Accordingly, it is possible to reduce internal resistance of a secondary battery and therefore to well maintain its electrical characteristics. By setting the degree of swelling in electrolysis solution of the shell polymer to be at least the lower limit value of the above-described range, it is possible to improve rate characteristics of a secondary battery. By setting the degree of swelling in electrolysis solution of the shell polymer to be no greater than the upper limit value of the above-described range, it is possible to increase adhesion of the adhesive layer.

The electrolysis solution used for the measurement of the degree of swelling in electrolysis solution of the shell polymer is the same as that used for the measurement of the degree of swelling in electrolysis solution of the core polymer.

The degree of swelling in electrolysis solution of the shell polymer can be measured in a manner as specifically described below.

First, a polymer for the shell of the organic particles is prepared. For example, a polymer is produced as in the production method of core by using, instead of a monomer composition for core, a monomer composition for shell in the production method of the organic particles.

Thereafter, using the same method as that used for the measurement of the degree of swelling of the core, a film is prepared from the shell polymer, a test specimen is cut from the film, and the test specimen is measured for degree of swelling (S).

An exemplary method of adjusting the degree of swelling in electrolysis solution of the shell polymer is to properly select the type and amount of a monomer used for the production of the shell polymer in consideration of the SP value of the electrolysis solution.

The monomer used for the production of the shell polymer may be appropriately selected from those that provide polymers whose degree of swelling in electrolysis solution falls within the above-described range. Examples of such monomers include monomers similar to those exemplified above as monomers which may be used for the production of the core polymer. Such monomers may be used alone or in combination at any ratio.

Of these monomers, aromatic vinyl monomers are preferable as monomers used for the production of the shell polymer. Specifically, the shell polymer preferably contains an aromatic vinyl monomer unit. Among aromatic vinyl monomers, styrene and styrene derivatives such as styrene sulfonic acid are preferable. Aromatic vinyl monomers not only make it easy to control the degree of swelling in electrolysis solution of the polymer, but can further increase adhesion of the adhesive layer.

The percentage of the aromatic vinyl monomer unit in the shell polymer is preferably 20% by mass or more, more preferably 40% by mass or more, still more preferably 50% by mass or more, yet more preferably 60% by mass or more, particularly preferably 80% by mass or more, preferably 100% by mass or less, more preferably 99.5% by mass or less, and still more preferably 99% by mass or less. By setting the percentage of the aromatic vinyl monomer unit to fall within the above-described range, the degree of swelling in electrolysis solution of the shell can be easily set to fall within the above-described range. Further, it is possible to further increase adhesion of the adhesive layer in electrolysis solution.

The shell polymer may contain an acid group-containing monomer unit, other than the aromatic vinyl monomer unit. Examples of acid group-containing monomers include monomers having an acid group, such as carboxyl group-containing monomers, sulfonate group-containing monomers, phosphate group-containing monomers, and hydroxyl group-containing monomers. Specifically, examples of the acid group-containing monomers include monomers similar to acid group-containing monomers which may be contained in the core.

Of these acid group-containing monomers, carboxylic acid group-containing monomers are preferable, with monocarboxylic acids being more preferable, and (meth)acrylic acid being still more preferable.

These acid group-containing monomers may be used alone or in combination at any ratio.

The percentage of the acid group-containing monomer unit in the shell polymer is preferably 0.1% by mass or more, more preferably 1% by mass or more, still more preferably 3% by mass or more, preferably 20% by mass or less, more preferably 10% by mass or less, and still more preferably 7% by mass or less. By setting the percentage of the acid group-containing monomer unit to fall within the above-described range, it is possible to improve dispersibility of the organic particles in the adhesive layer allowing good adhesion to be exerted over the entire surface of the adhesive layer.

The shell polymer may contain a cross-linkable monomer unit. Examples of cross-linkable monomers include monomers similar to those exemplified above as cross-linkable monomers which may be used for the production of the core polymer. These cross-linkable monomers may be used alone or in combination at any ratio.

The percentage of the cross-linkable monomer unit in the shell polymer is preferably 0.1% by mass or more, more preferably 0.2% by mass or more, still more preferably 0.5% by mass or more, preferably 5% by mass or less, more preferably 4% by mass or less, and still more preferably 3% by mass or less.

The shell polymer preferably has a glass-transition temperature of 50° C. or higher, more preferably 60° C. or higher, still more preferably 70° C. or higher, preferably 200° C. or below, more preferably 180° C. or below, still more preferably 150° C. or below, and particularly preferably 120° C. or below. By setting the glass-transition temperature of the shell polymer to be at least the lower limit value of the above-described range, it is possible to suppress the occurrence of blocking of the laminate for non-aqueous secondary battery disclosed herein having an adhesive layer, and to further improve rate characteristics of a secondary battery. By setting the glass-transition temperature of the shell polymer to be no greater than the upper limit value of the above-described range, it is possible to further increase adhesion of the adhesive layer in electrolysis solution. By setting the glass-transition temperature of the shell polymer to fall within the above-described range, it is further possible to improve cycle characteristics of a secondary battery.

The shell preferably has an average thickness that falls within a specific range in percentage with respect to the volume-average particle diameter of the organic particles. Specifically, the average shell thickness in percentage with respect to the volume-average particle diameter of the organic particles is preferably 1% or more, more preferably 2% or more, and still more preferably 5% or more, preferably 30% or less, more preferably 25% or less, and still more preferably 20% or less. By setting the average shell thickness to be at least the lower limit value of the above-described range, it is possible to further increase adhesion of the adhesive layer. By setting the average shell thickness to be no greater than the upper limit value of the above-described range, it is possible to further improve rate characteristics of a secondary battery.

The average shell thickness can be obtained by the observation of cross-sectional structures of organic particles by transmission electron microscopy (TEM). Specifically, the maximum shell thickness in a cross-sectional structure of an organic particle is measured by TEM. 20 or more randomly-selected organic particles are measured for their maximum shell thickness, and an average of the measured maximum thicknesses is recorded as an average shell thickness. However, in the case that the shell is composed of polymer particles and these polymer particles are arranged in a monolayer without being stacked on top of one another in the radial direction of the organic particle, the number-average particle diameter of the polymer particles is recorded as an average shell thickness.

Although the shell may take any form, it is preferably composed of polymer particles. When the shell is composed of polymer particles, these shell particles may be stacked on top of one another in the radial direction of the organic particle. However, shell particles are preferably arranged in a monolayer to constitute a shell without being stacked on top of one another in the radial direction of the organic particle.

When the shell is composed of polymer particles, these shell particles preferably have a number-average particle diameter of 10 nm or more, more preferably 20 nm or more, still more preferably 30 nm or more, preferably 200 nm or less, more preferably 150 nm or less, and still more preferably 100 nm or less. By setting the number-average particle diameter to fall within the above-described range, it is possible to establish a good balance between ion diffusivity and adhesion of the adhesive layer.

The number-average particle diameter of shell particles can be obtained by the observation of cross-sectional structures of organic particles by transmission electron microscopy (TEM). Specifically, the maximum diameter of shell particles in a cross-sectional structure of an organic particle is measured, and an average of the maximum shell particle diameters for 20 or more organic particles is recorded as a number-average particle diameter of shell particles.

—Blending Amount of Organic Particles—

The amount of the organic particles in an adhesive is preferably set such that the percentage of the organic particles in the adhesive layer falls within a specific range. Specifically, the percentage of the organic particles in an adhesive is preferably 50% by mass or more, more preferably 60% by mass or more, still more preferably 70% by mass or more, particularly preferably 80% by mass or more, preferably 99.9% by mass or less, more preferably 99% by mass or less, still preferably 98% by mass or less, and particularly preferably 96% by mass or less. By setting the amount of the organic particles to fall within the above-described range, it is possible to increase adhesion as well as ion diffusivity of the adhesive layer.

—Production Method of Organic Particles—

Organic particles having the core-shell structure described above can be produced for example by stepwise polymerization of monomers for core and shell polymers with the ratios of these monomers being changed over time. Specifically, the organic particles can be produced by continuous, multi-stage emulsion polymerization and multi-stage suspension polymerization wherein, e.g., a polymer produced in a previous stage is sequentially covered with a polymer produced in a later stage.

By way of example, the following describes an exemplary case where organic particles having the core-shell structure described above are obtained by multi-stage emulsion polymerization.

For polymerization, as emulsifiers, anionic surfactants such as sodium dodecylbenzene sulfonate and sodium dodecyl sulfonate; nonionic surfactants such as polyoxyethylene nonylphenyl ether and sorbitan monolaurate; or cationic surfactants such as octadecylamine acetate can be used in accordance with a common procedure. As polymerization initiators, peroxides such as t-butyl peroxy-2-ethylhexanoate, potassium persulfate and cumene peroxide; or azo compounds such as 2,2'-azobis(2-methyl-N-(2-hydroxyethyl)-propionamide), and 2,2'-azobis(2-amidinopropane) hydrochloride can be used.

The polymerization procedure is as follows: A monomer for core and an emulsifier are first mixed into a polymerization solvent such as water, followed by addition of a polymerization initiator to effect batch emulsion polymerization of the monomer to yield a particulate core polymer. Polymerization of a monomer for shell is then effected in the presence of this particulate core polymer to afford organic particles having the core-shell structure described above.

At this time, from the perspective of achieving partial shell coverage on the core outer surface, the monomer for shell polymer is preferably supplied to the polymerization system either multiples times in divided portions or continuously. By supplying the monomer for shell polymer to the polymerization system either multiple times in divided portions or continuously, a shell polymer is produced in particulate form and this particle binds to a core. In this way, a shell that partially covers a core can be formed.

When the monomer for shell polymer is supplied multiple times in divided portions, it is possible to control the particle diameters of shell particles and the average shell thickness according to the number of divided portions. When the monomer for shell polymer is supplied continuously, it is possible to control the particle diameters of shell particles and the average shell thickness by adjusting the amount of the monomer supplied per unit time.

When a monomer that has a low affinity for polymerization solvent is used as the monomer for the shell polymer, a shell that partially covers a core tends to be easily formed. When water is used as a polymerization solvent, the monomers for the shell polymer preferably include a hydrophobic monomer, particularly preferably an aromatic vinyl monomer.

Further, when smaller amounts of emulsifier are used for the polymerization of the monomer for shell, a shell that partially covers a core tends to be easily formed. Thus, a shell that partially covers a core can be formed also by appropriately adjusting the amount of emulsifier.

The volume-average particle diameter of the particulate core polymer, volume-average particle diameter of organic particles after shell formation, and number-average particle diameter of shell particles can be set to fall within their desired ranges for example by the adjustment of the amounts of emulsifier and monomer, for example.

Further, the average ratio of shell coverage on the core outer surface can be set to fall within a desired range for example by the adjustment of the amount of emulsifier and the amount of the monomer for the shell polymer correspondingly with the volume-average particle diameter of the particulate core polymer.

[[Particulate Polymer for Adhesive Layer]]

As described above, the organic particles do not normally exert adhesion when not swollen in electrolysis solution. Thus, from the perspective of preventing the organic particles from coming off the adhesive layer prior to immersion into electrolysis solution, as an adhesive, it is preferable to use a particulate polymer for adhesive layer, which exerts adhesion even when not swollen in electrolysis solution, in combination with the organic particles. The use of a particulate polymer for adhesive layer allows the organic particles to be bound together both when they are swollen in electrolysis solution and when they are not swollen in electrolysis solution.

Examples of particulate polymers for adhesive layer which may be used in combination with the organic particles as an adhesive include water insoluble, water-dispersible particulate polymers known in the art. Specifically, particulate polymers similar to those for functional layer can be used as particulate polymers for adhesive layer.

The content of the particulate polymer for adhesive layer in the adhesive layer is preferably 0.1 parts by mass or more, more preferably 0.2 parts by mass or more, preferably 15 parts by mass or less, and more preferably 10 parts by mass or less per 100 parts by mass of the organic particles. When the particulate polymer for adhesive layer is contained in an amount of 0.1 parts by mass or more per 100 parts by mass of the organic particles, it is possible to ensure sufficient binding capacity and thus to sufficiently prevent the organic particles and the like from coming off the adhesive layer prior to immersion into electrolysis solution. When the particulate polymer for adhesive layer is contained in an amount of 15 parts by mass or less per 100 parts by mass of the organic particles, it is possible to suppress reductions in electrical characteristics of a non-aqueous secondary battery such as rate characteristics due to increased internal resistance of the adhesive layer.

[Additional Additives]

Examples of additional additives which may be contained in the adhesive layer in addition to the adhesive described above include additives known in the art, such as viscosity modifiers, wetting agents, and additives for electrolysis solution. Any of these additives known in the art can be used as long as they do not affect battery reactions. These additives can be used alone or in combination at any ratio.

[[Wetting Agent]]

A wetting agent refers to an agent that improves, when an adhesive layer composition (aqueous slurry composition obtained by dissolving or dispersing the above-described adhesive and the like into a hydrophilic solvent such as water) is applied on the above-described functional layer and the applied adhesive layer composition is dried to form an adhesive layer, wettability of the adhesive layer composition to improve uniformity of the adhesive layer.

Any wetting agent can be used; any of the wetting agents known in the art can be used, such as nonionic surfactants. Specific examples of usable wetting agents include polyethylene glycol-based surfactants (e.g., "SN Wet 366" from SAN NOPCO Ltd.); polyoxyalkylene alkyl ether-based surfactants (e.g., "SN Wet 980" from SAN NOPCO Ltd.); polyol-based nonionic surfactants (e.g., "Nopcowet SN-20T" from SAN NOPCO Ltd.); polyoxyethylene distyrenated phenyl ethers (e.g., "EMULGEN A-90" and "EMULGEN B-66" from Kao Corporation); polyoxyethylene tribenzyl phenyl ethers (e.g., "EMULGEN B-66" from Kao Corporation); and polyoxyalkylene alkyl ethers (e.g., "EMULGEN LS-106" "EMULGEN LS-110", "EMULGEN LS-114" and "EMULGEN MS-110" from Kao Corporation).

Any amount of wetting agent can be used; for example, it can be normally used in an amount of 0.01 parts by mass or more, preferably 0.02 parts by mass or more per 100 parts by mass of the organic particles, normally 1 part by mass or less, and preferably 0.5 parts by mass or less per 100 parts by mass of the organic particles.

<Method of Forming Adhesive Layer>

The adhesive layer containing the aforementioned components can be prepared using an adhesive layer composition which is obtained by dissolving or dispersing the components described above in a hydrophilic solvent as a dispersion medium. Specifically, the adhesive layer can be formed for example by applying the adhesive layer composition onto a functional layer and drying the adhesive layer composition applied.

By forming the adhesive layer on a functional layer as described above, the laminate for non-aqueous secondary battery disclosed herein can be manufactured.

Hydrophilic solvents similar to those used for the slurry composition for functional layer can be used, with water being preferable among them.

Preparation, application and drying of the adhesive layer composition can be performed in any manner and can be performed as in the case of the slurry composition for functional layer.

In the laminate for non-aqueous secondary battery disclosed herein, since a film obtained by shaping of the water-soluble polymer described above contained in a functional layer has a water drop contact angle of 30° to 80°, even when an adhesive layer composition containing a hydrophilic solvent is applied onto the functional layer to form an adhesive layer, it is possible to suppress re-dissolution of the water-soluble polymer in the functional layer. Accordingly, it is possible to suppress reductions in peel strength of a battery member and reductions in the function of the functional layer.

(Non-Aqueous Secondary Battery)

The non-aqueous secondary battery disclosed herein includes the laminate for non-aqueous secondary battery described above. Specifically, the non-aqueous secondary battery disclosed herein includes a positive electrode, a negative electrode, a separator, and electrolysis solution, wherein the laminate for non-aqueous secondary battery described above is used in at least one of the positive electrode, negative electrode, and separator. In the non-aqueous secondary battery disclosed herein, the positive electrode and separator, and/or, the negative electrode and separator are integrated by bonding via the adhesive layer of the laminate for non-aqueous secondary battery.

The positive electrode, negative electrode and separator which do not include the laminate for non-aqueous secondary battery described above and the electrolysis solution may be selected from those known in the art which are commonly used in non-aqueous secondary batteries.

Specifically, the electrodes (positive electrode and negative electrode) which do not include the laminate for non-aqueous secondary battery described above may be formed of a current collector and an electrode mixed material layer formed on the current collector. The current collector may be made of metal material such as iron, copper, aluminum, nickel, stainless steel, titanium, tantalum, gold, or platinum. Of these metal materials, the current collector for negative electrode is preferably made of copper. The current collector for positive electrode is preferably made of aluminum. The electrode mixed material layer can be a layer containing an electrode active material and a binder.

The electrolysis solution can be normally an organic electrolysis solution obtained by dissolving a supporting electrolyte into an organic solvent. For example, when the non-aqueous secondary battery is a lithium ion secondary battery, a lithium salt is used as the supporting electrolyte. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable in that they easily dissolve in solvent and exhibit a high degree of dissociation, with $LiPF_6$ being particularly preferable. Electrolytes may be used alone or in combination at any ratio. Normally, lithium ion conductivity tends to increase as a supporting electrolyte with a higher degree of dissociation is used. Therefore, lithium ion conductivity can be adjusted by the type of supporting electrolyte.

Any organic solvent that can dissolve the supporting electrolyte can be used as the organic solvent in the electrolysis solution. Preferred examples include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. A mixed solution of these solvents may also be used. Of these solvents, carbonates are preferable for their high dielectric constant and broad stable potential region, and a mixture of ethylene carbonate and ethyl methyl carbonate is more preferable.

The electrolyte concentration in the electrolysis solution can be adjusted as needed. For example, the electrolyte concentration is preferably 0.5% to 15% by mass, more preferably 2% to 13% by mass, and still more preferably 5% to 10% by mass. Any additive known in the art may be added to the electrolysis solution, such as fluoroethylene carbonate or ethyl methyl sulfone.

Any separator can be used as a separator that does not include the laminate for non-aqueous secondary battery described above; for example, those described in JP2012-204303A can be used. Of these separators, fine porous membranes made of polyolefinic (i.e., polyethylene, polypropylene, polybutene, and polyvinyl chloride) resin are preferable for their ability to reduce total separator thickness thus increasing the ratio of the electrode active material in the secondary battery and consequently increasing the capacity per volume.

In the laminate for non-aqueous secondary battery disclosed herein, since battery members such as electrodes and separator are firmly bonded together via the adhesive layer of the laminate for non-aqueous secondary battery described above, cell bulging as well as increases in interelectrode distance are suppressed, resulting in improvement in electrical characteristics such as rate characteristics and cycle characteristics.

<Method of Manufacturing Lithium Ion Secondary Battery>

The non-aqueous secondary battery disclosed herein can be manufactured for example by stacking a positive electrode and a negative electrode with a separator provided therebetween, spirally winding or folding the resulting laminate as necessary in accordance with the battery shape, placing it in a battery container, filling the battery container with an electrolysis solution, and sealing the container. To prevent an internal pressure rise in the non-aqueous secondary battery and the occurrence of overcharge/overdischarge and other events, the non-aqueous secondary battery may include, for example, an overcurrent preventing device such as a fuse or a PTC device; expanded metal; and/or a lead plate. The secondary battery may take any shape, such as coin, button, sheet, cylindrical, square or flat shape.

EXAMPLES

Hereinafter, the disclosed products and methods will be specifically described with reference to Examples; however, the disclosure is not limited to the Examples. In the following, "%" and "parts" used to express quantities are by mass, unless otherwise specified.

In Examples and Comparative Examples, the water drop contact angle of a water-soluble polymer; the glass-transition temperature and degree of swelling in electrolysis solution of a polymer of an organic particle; the average ratio of shell coverage over the outer surface of the core of an organic particle (ratio of coverage); average shell thickness (core-shell ratio); the volume-average particle diameter of particles; peel strength and permeability of a separator; and bulging resistance, cycle characteristics and rate characteristics of a secondary battery were measured and evaluated by the methods described below.

<Water Drop Contact Angle>

A water-soluble polymer in aqueous solution was transferred to a polytetrafluoroethylene (PTFE) petri dish and dried by allowing it to stand for 72 hours at 50% RH at 60° C. to fabricate a 1 cm×1 cm square film made of the water-soluble polymer. 3 μL of distilled water was then dropped onto the film thus obtained, and after a lapse of 1 minute from dropping of distilled water, the water droplet formed was measured for contact angle at 23° C. at 50% RH using a contact angle meter (model CA-DT-A mfd., from Kyowa Interface Science Co., Ltd.). Contact angle was measured at two points (left and right) of each of three samples of the film. Contact angle was reported as an average of the 6 measurements. The droplets of distilled water were each 2 mm in diameter, and the value for contact angle displayed on the meter was a value measured after a lapse of 1 minute from dropping of each droplet of distilled water.

<Glass-Transition Temperature>

Using monomer compositions used for the preparation of the core and shell of the organic particles, water dispersions of polymers (for core and for shell) as measurement specimens were prepared using polymerization conditions similar to those used for the core and shell.

Next, a DSC curve was measured on a differential scanning calorimeter ("EXSTAR DSC6220" from SII Nano-Technology Inc.) at standard temperature and standard humidity in the measurement temperature range of −100° C. to 500° C. at a heating rate of 10° C./min, where 10 mg of dried sample specimen was weighed into an aluminum pan, and an empty aluminum pan was used as a reference. The glass-transition temperature was determined from the point of the intersection of the baseline immediately before appearance of an endothermic peak in the DSC curve where the differential signal (DDSC) reaches 0.05 mW/min/mg or higher with the tangent to the DSC curve at the inflection point that appears first after the endothermic peak in the heating step.

<Degree of Swelling in Electrolysis Solution>

Using monomer compositions used for the preparation of the core and shell of the organic particles, water dispersions of polymers (for core and for shell) as measurement specimens were prepared using polymerization conditions similar to those used for the core and shell.

Next, the water dispersions thus obtained were each placed in a polytetrafluoroethylene petri dish and dried at 25° C. for 48 hours to manufacture a 0.5 mm thick film. Each obtained film was cut into a 1 cm×1 cm square sheet to provide a test specimen. The weight (W0) of the test specimen was measured. The test specimen was immersed into electrolysis solution at 60° C. for 72 hours. The test specimen was then taken out from the electrolysis solution, the electrolysis solution on the surface of the test specimen was wiped off, and the weight (W1) of the test specimen after immersion was measured. Using weights W0 and W1, the degree of swelling S (fold) was calculated using the equation S=W1/W0.

The electrolysis solution was prepared by dissolving supporting electrolyte $LiPF_6$ into a mixture solvent of ethylene carbonate (EC), diethyl carbonate (DEC) and vinylene carbonate (VC) (mixing ratio: EC/DEC/VC=68.5/30/1.5 (by volume), SP value: 12.7 $(cal/cm^3)^{1/2}$) at a concentration of 1 mol/L.

<Ratio of Coverage on Core Outer Surface>

Organic particles were fully dispersed in visible light-curable epoxy resin ("D-800" from JEOL Ltd.) and then embedded to form a block piece containing the organic particles. A thin slice of 100 nm thickness was then cut from the block piece using a microtome equipped with a diamond blade to prepare a measurement specimen. Thereafter, the measurement specimen was subjected to dying treatment using ruthenium tetroxide.

The dyed measurement specimen was then loaded into a transmission electron microscope ("JEM-3100F" from JEOL Ltd.), and an image of a cross-sectional structure of a particulate polymer was captured at an acceleration voltage of 80 kV. The magnification of the electron microscope was set such that a cross-section of one organic particle was within the field of view. In the cross-sectional structure of the captured organic particle, length D1 (circumferential length of the core) and length D2 (length of a part where the core outer surface contacts the shell) were measured, and the ratio of shell coverage on the core outer surface of that organic particle (Rc) was calculated using the following Equation (1):

$$\text{Ratio of coverage } Rc\ (\%) = (D2/D1) \times 100 \quad (1)$$

The ratio of coverage (Rc) was measured for 20 randomly-selected organic particles, and an average was calculated. The calculated average was recorded as an average ratio of shell coverage on the core outer surface (ratio of coverage).

<Average Shell Thickness (Core-Shell Ratio)>

The average shell thickness of organic particles was measured through the procedure described below.

When the shell is composed of polymer particles, a cross-sectional structure of an organic particle was observed by transmission electron microscopy as in the measurement of the ratio of coverage described above. From the cross-sectional structure of the organic particle observed, the maximum diameter of shell polymer particles was then measured. 20 randomly-selected organic particles were measured for their maximum diameter of shell polymer particles, and an average of the maximum diameters was recorded as an average shell thickness.

When the shell has a shape other than particulate shape, a cross-sectional structure of an organic particle was observed by transmission electron microcopy as in the measurement of the ratio of coverage described above. From the cross-sectional structure of the organic particle observed, the maximum shell thickness was measured. 20 randomly-selected organic particles were measured for their maximum shell thickness, and an average of the maximum shell thicknesses was recorded as an average shell thickness.

The core-shell ratio (unit: %), which represents the ratio of average shell thickness to volume-average particle diameter of organic particles, was then calculated by dividing the measured average shell thickness by the volume-average particle diameter of the organic particles for evaluation of average shell thickness.

<Volume-Average Particle Diameter>

The volume-average particle diameter was recorded as a particle diameter where the cumulative volume from the fine side amounts to 50% of the entire volume in a particle size distribution measured by a laser diffraction particle size analyzer ("SALD-3100" from Shimadzu Corporation).

<Peel Strength>

The separator manufactured was cut into a rectangular piece measuring 100 mm in length and 10 mm in width to prepare a test specimen. An adhesive cellophane tape was affixed on the test stage beforehand. An adhesive cellophane tape specified in JIS Z1522 was used. The test specimen was attached to the adhesive cellophane tape with the adhesive layer surface facing downward. In this way, the test specimen was attached to the adhesive cellophane tape on the adhesive layer surface. Subsequently, the stress at the time when the separator was peeled by pulling up one end in the vertical direction at a pulling rate of 50 mm/min was measured. The measurement was made 3 times. An average of the measured values was recorded as peel strength (N/m) and evaluated based on the criteria below.

A: peel strength is greater than 65 N/m
B: peel strength is greater than 55 N/m but equal to or less than 65 N/m
C: peel strength is greater than 45 N/m but equal to or less than 55 N/m
D: peel strength is equal to or less than 45 N/m <Permeability>

The separator and porous membrane layer-attached separator substrate prior to adhesive layer formation manufactured were measured for their Gurley number (sec/100 cc) using a Gurley meter (SMOOTH & POROSITY METER (measurement diameter: 2.9 cm), from Kumagai Riki Kogyo Co., Ltd.). Specifically, using Gurley number G0 for "separator substrate+porous membrane layer" prior to adhesive layer formation and Gurley number G1 for "separator substrate+porous membrane layer+adhesive layer" after adhesive layer formation, % increase in the Gurley number $\Delta G$ (=[(G1−G0)/G0]×100) was calculated and evaluated based on the criteria below. A smaller % increase in the Gurley number $\Delta G$ indicates a smaller reduction in permeability of a separator due to formation of an adhesive layer.

A: % increase $\Delta G$ is less than 5%
B: % increase $\Delta G$ is 5% or greater but less than 10%
C: % increase $\Delta G$ is 10% or greater but less than 20%
D: % increase $\Delta G$ is 20% or greater <Bulging Resistance>

The lithium ion secondary battery manufactured was allowed to stand for 24 hours in the environment of 25° C., and then charged at 0.1 C and 4.35V and discharged at 0.1 C and 2.75V in the environment of 25° C. The cell was immersed into liquid paraffin and its volume V0 was measured. In the environment of 60° C., the above-described charging/discharging was repeated for 1,000 cycles. Subsequently, the cell was immersed into liquid paraffin and its volume V1 was measured. % volume change between before and after 1,000 cycles of charge and discharge $\Delta V$ (=[(V1−V0)/V0]×100) was calculated to evaluate bulging resistance based on the criteria below. A smaller % volume change $\Delta V$ indicates lesser cell bulging and therefore superior bulging resistance.

A: % volume change $\Delta V$ is less than 30%
B: % volume change $\Delta V$ is 30% or greater but less than 40%
C: % volume change $\Delta V$ is 40% or greater but less than 50%
D: % volume change $\Delta V$ is 50% or greater <Cycle Characteristics>

The lithium ion secondary battery manufactured was allowed to stand for 24 hours in the environment of 25° C., and then charged at 0.1 C and 4.35V and discharged at 0.1 C and 2.75V in the environment of 25° C., and initial capacity C0 was measured. In the environment of 60° C., the above-described charging/discharging was then repeated for 1,000 cycles, and capacity C1 after 1000 cycles was measured. % capacity maintenance after 1,000 cycles of charge and discharge $\Delta C$=(C1/C0)×100 was calculated and high-temperature cycle characteristics were evaluated based on the criteria below. A higher % capacity maintenance $\Delta C$ indicates superior cycle characteristics and therefore longer life.

A: % capacity maintenance $\Delta C$ is 85% or greater
B: % capacity maintenance $\Delta C$ is 80% to less than 85%
C: % capacity maintenance $\Delta C$ is less than 80%

<Rate Characteristics>

The lithium ion secondary battery manufactured was allowed to stand for 24 hours in the environment of 25° C., and then charged at 0.1 C to 4.35V and discharged at 0.1 C to 2.75V in the environment of 25° C., and initial capacity C0 was measured. In the environment of 25° C., the lithium ion secondary battery was then charged at 0.1 C to 4.35V and discharged at 2 C to 2.75V, and capacity C2 was measured. % capacity change $\Delta C'$=(C2/C0)×100 was calculated and rate characteristics were evaluated based on the criteria below. A larger % capacity change $\Delta C'$ indicates superior rate characteristics.

A: % capacity change $\Delta C'$ is 90% or greater
B: % capacity change $\Delta C'$ is 85% or greater but less than 90%
C: % capacity change $\Delta C'$ is 80% or greater but less than 85%
D: % capacity change $\Delta C'$ is less than 80%

Example 1

<Preparation of Particulate Polymer>

A reactor equipped with a stirrer was charged with 70 parts of ion-exchanged water, 0.15 parts of sodium lauryl sulfate ("EMAL 2F" from Kao Chemicals) as an emulsifier and 0.5 parts of ammonium persulfate. The gas phase was purged with nitrogen gas, and the temperature was raised to 60° C.

In another vessel, 50 parts of ion-exchanged water, 0.5 parts of sodium dodecylbenzenesulfonate as a dispersant, and 94 parts of butyl acrylate, 2 parts of acrylonitrile, 2 parts of methacrylic acid, 1 part of allylmethacrylate and 1 part of acrylamide as polymerizable monomers were mixed to afford a monomer composition. The monomer composition was continuously added to the reactor over 4 hours to effect polymerization. During addition, the temperature was retained at 60° C. for polymerization reaction. After completion of addition, the reaction mass was stirred for a further 3 hours at 70° C. to afford a water dispersion containing acrylic polymer A as a particulate polymer.

The resultant acrylic polymer A had a volume-average particle diameter D50 of 0.36 µm and a glass-transition temperature of −45° C.

<Preparation of Water-Soluble Polymer>

A reactor equipped with a stirrer was charged with 70 parts of ion-exchanged water, 0.15 parts of sodium lauryl sulfate ("EMAL 2F" from Kao Chemicals) as an emulsifier, 0.5 parts of ammonium persulfate and 0.02 parts of sodium carbonate. The gas phase was purged with nitrogen gas, and the temperature was raised to 70° C.

In another vessel, 50 parts of ion-exchanged water, 0.5 parts of sodium dodecylbenzenesulfonate as a dispersant, 57 parts of ethyl acrylate and 12.2 parts of butyl acrylate as (meth)acrylic acid ester monomers, 30 parts of methacrylic acid as an acid group-containing monomer, and 0.8 parts of ethylene glycol dimethacrylate as a cross-linkable monomer were mixed to afford a monomer composition. The monomer composition was continuously added to the reactor over 4 hours for polymerization. During addition, the temperature was retained at 70° C. for polymerization reaction. After completion of addition, the reaction mass was stirred for a further 3 hours at 70° C. to afford a water dispersion containing acrylic polymer B as a polymer.

The resultant acrylic polymer B had a volume-average particle diameter D50 of 0.15 µm and a glass-transition temperature of 30° C. The pH of the water dispersion was 5.1.

Adjustment of the pH of the water dispersion of acrylic polymer B to 8 with 10% sodium hydroxide aqueous solution promoted solubilization of acrylic polymer B to afford a clear aqueous solution. Thus, acrylic polymer B was confirmed to be water-soluble at pH 8.

The water drop contact angle of acrylic polymer B (water-soluble water) was measured. The results are shown in Table 1.

<Preparation of Slurry Composition for Functional Layer (Slurry Composition for Porous Membrane Layer)>

100 parts of spherical barium sulfate having an isoelectric point of 4.1 as functional particles for porous membrane layer (non-conductive particles) was mixed with 1.5 parts in solid content equivalent of the water dispersion containing acrylic polymer B as a water-soluble polymer, 6 parts in solid content equivalent of the water dispersion containing acrylic polymer A as a particulate polymer for functional layer, and 0.2 parts of polyethylene glycol-based surfactant ("SN Wet 366" from SAN NOPCO Ltd.) as a wetting agent to produce a slurry composition for functional layer. The pH of the slurry composition for functional layer was 7.2.

<Preparation of Organic Particles>

A 5 MPa pressure resistant vessel equipped with a stirrer was charged with, as monomers for core, 75 parts of methyl methacrylate as a (meth)acrylic acid ester monomer, 4 parts of methacrylic acid as an acid group-containing monomer and 1 part of ethylene glycol dimethacrylate as a cross-linkable monomer, 1 part of sodium dodecylbenzene sulfonate as an emulsifier, 150 parts of ion-exchanged water, and 0.5 parts of potassium persulfate as a polymerization initiator. After fully stirred, the temperature was raised to 60° C. to initiate polymerization. When the polymerization conversion rate reached 96%, a mixture of 19 parts of styrene as an aromatic vinyl monomer and 1 part of methacrylic acid as an acid group-containing monomer was then continuously added as monomers for shell, and the reaction mass was heated to 70 C.° to continue polymerization. When the polymerization conversion rate reached 96%, the reaction was quenched by cooling to produce a water dispersion containing organic particles A.

The resultant organic particles A had a volume-average particle diameter D50 of 0.45 µm.

The organic particles A were then evaluated for ratio of coverage and core-shell ratio. The results are shown in Table 1.

<Preparation of Adhesive Layer Composition>

100 parts in solid content equivalent of the water dispersion of organic particles A was mixed with 6 parts in solid content equivalent of the water dispersion containing acrylic polymer A as a particulate polymer for adhesive layer and 0.2 parts of a polyethylene glycol-based surfactant ("SN Wet 366" from SAN NOPCO Ltd.) as a wetting agent to produce an adhesive layer composition.

<Manufacture of Separator>

An organic separator substrate formed of a porous polypropylene substrate ("2500" from Celgard Inc; 25 µm thick) was provided. The slurry composition for functional layer (slurry composition for porous membrane layer) was applied on one side of the organic separator substrate and dried for 10 minutes at 60° C. In this way, a porous membrane layer-attached separator substrate was obtained, which has a 27 µm-thick porous membrane layer as a functional layer.

Next, the adhesive layer composition was applied on the porous membrane layer and dried for 10 minutes at 60° C. In this way a separator having a laminate for non-aqueous secondary battery on an organic separator substrate was obtained, wherein the laminate is composed of the porous membrane layer and the adhesive layer of a total thickness of 28 µm (27 µm thick porous membrane layer and 1 µm thick adhesive layer).

The separator thus obtained was evaluated for peel strength and permeability. The results are shown in Table 1.

<Manufacture of Negative Electrode>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzene sulfonate as an emulsifier, 150 parts of ion-exchanged water, and 0.5 parts of potassium persulfate as a polymerization initiator. After fully stirred, the temperature was raised to 50° C. to initiate polymerization. When the polymer conversion rate reached 96%, the reaction was quenched by cooling to afford a mixture containing a particulate binder (SBR). After adjusting the pH of the mixture containing a particulate binder to 8 by the addition of 5% sodium hydroxide aqueous solution, unreacted monomers were removed by thermal-vacuum distillation. Thereafter, the mixture was cooled to 30° C. or below to afford a water dispersion containing a desired particulate binder.

Next, 100 parts of synthetic graphite (average particle diameter: 15.6 µm) as a negative electrode active material, 1 part in solid content equivalent of 2% aqueous solution of sodium salt of carboxymethyl cellulose ("MAC350HC" from Nippon Paper Industries Co., Ltd.) as a thickener and ion-exchanged water were mixed to a solid content concentration of 68%, and mixed for 60 minutes at 25° C. Subsequently, the solid content concentration was adjusted to 62% by the addition of ion-exchanged, and the mixture was further mixed at 25° C. for 15 minutes. To the mixture obtained was added 1.5 parts in solid content equivalent of the particulate binder (SBR) and ion-exchanged water to a final solid content concentration of 52%, and further mixed for 10 minutes. The resultant mixture was subjected to defoaming treatment under reduced pressure to afford a slurry composition for secondary battery negative electrode with good fluidity.

The negative electrode slurry composition thus obtained was applied by a comma coater onto a 20 μm-thick copper foil (current collector) to a dry film thickness of on the order of 150 μm, and dried. This drying was performed by transporting the copper foil through an oven at 60° C. at a rate of 0.5 m/min over 2 minutes. After that, the copper foil was heat-treated for 2 minutes at 120° C. Thus, a pre-press web of negative electrode was obtained. The pre-press web of negative electrode was rolled with a roll press to afford a post-press negative electrode in which the negative electrode mixed material layer is 80 μm in thickness (single-sided negative electrode).

Further, application and drying of the negative electrode slurry composition was performed on the rear side of the pre-press web of negative electrode as in the case for the front side to afford a pre-press web of negative electrode having negative electrode mixed material layers on both sides. The web of negative electrode having negative electrode mixed material layers on both sides was then rolled by a roll press to afford a post-press negative electrode in which the negative electrode mixed material layers are each 80 μm in thickness (double-sided negative electrode).

<Manufacture of Positive Electrode>

100 parts of $LiCoO_2$ as a positive electrode active material (volume-average particle diameter: 12 μm), 2 parts of acetylene black "(HS-100" from DENKI KAGAKU KOGYO KABUSHIKI KAISHA) as a conductor, 2 parts in solid content equivalent of PVDF (#7208 from KUREHA Corporation) as a binder, and NMP were mixed to a total solid content concentration of 70%. These materials were mixed with a planetary mixer to prepare a positive electrode slurry composition.

The positive electrode slurry composition thus obtained was applied by a comma coater onto a 20 μm-thick aluminum foil (current collector) to a dry film thickness of on the order of 150 μm, and dried. This drying was performed by transporting the aluminum foil through an oven at 60° C. at a rate of 0.5 m/min over 2 minutes. After that, the aluminum foil was heat-treated for 2 minutes at 120° C. Thus, a pre-press web of positive electrode was obtained. The pre-press web of positive electrode was rolled with a roll press to afford a post-press positive electrode in which the positive electrode mixed material layer is 80 μm in thickness (single-sided positive electrode).

Further, application and drying of the positive electrode slurry composition was performed on the rear side of the pre-press web of positive electrode as in the case for the front side to afford a pre-press web of positive electrode having positive electrode mixed material layers on both sides. The web of positive electrode having positive electrode mixed material layers on both sides was then rolled with a roll press to afford a post-press positive electrode in which the positive electrode mixed material layers are each 80 μm in thickness (double-sided positive electrode).

<Method of Manufacturing Lithium Ion Secondary Battery>

The pressed singled-sided positive electrode thus obtained was cut into a 5 cm×15 cm sheet, and the separator cut into a 6 cm×16 cm sheet was placed thereon so that the adhesive layer faces the positive electrode. Further, the double-sided negative electrode cut into a 5.5 cm×15.5 cm sheet was placed on the separator, and the separator cut into a 6 cm×16 cm sheet was placed on the double-sided negative electrode so that the adhesive layer faces the negative electrode. Next, the double-sided positive electrode cut into 5 cm×15 cm sheet was laminated on the separator, and the separator cut into a 6 cm×16 cm sheet was placed thereon so that the separator faces the negative electrode (side opposite to the positive electrode). Finally, the single-sided negative electrode cut into a 5.5 cm×15.5 cm sheet was placed on the separator so that the negative electrode mixed material layer faces the separator. The laminate was enclosed by an aluminum outer package as a battery outer package. Electrolysis solution (solvent: EC/DEC/VC=68.5/30/1.5 (by volume); electrolyte: 1M $LiPF_6$) was injected so as not to leave air. In order to tightly seal up the opening of the aluminum outer package, the aluminum package was closed by heat sealing at 150° C. Thereafter, the battery outer package was subjected to flat pressing for 2 minutes at 100° C. under a load of 100 kgf to manufacture a laminate-type lithium ion secondary battery with a discharge capacity of 1,000 mAh.

The lithium ion secondary battery obtained was evaluated for bulging resistance, cycle characteristics, and rate characteristics. The results are shown in Table 1.

Examples 2 to 4

Separators, positive electrodes, negative electrodes, and lithium ion secondary batteries were manufactured as in Example 1 except that as a water-soluble polymer an acrylic polymer was used which was prepared as with acrylic polymer B except that the blending amounts of ethyl acrylate and butyl acrylate as (meth)acrylic acid ester monomers and methacrylic acid as an acid group-containing monomer were changed as shown in Table 1 and that the pH of the slurry composition for functional layer was changed to levels shown in Table 1. Evaluations were then performed as in Example 1. The results are shown in Table 1.

The acrylic polymers prepared were confirmed to be water-soluble at pH 8.

Example 5

A separator, a positive electrode, a negative electrode, and a lithium ion secondary battery were manufactured as in Example 1 except that the pH of the slurry composition for functional layer was adjusted to a level shown in Table 1 by the addition of 10% ammonia water. Evaluations were then performed as in Example 1. The results are shown in Table 1.

Example 6

A separator, a positive electrode, a negative electrode, and a lithium ion secondary battery were manufactured as in Example 1 except that polystyrene sulfonic acid (from Wako Pure Chemical Industries, Ltd.) was used instead of acrylic polymer B as a water-soluble polymer and that the pH of the slurry composition for functional layer was changed to a level shown in Table 1. Evaluations were then performed as in Example 1. The results are shown in Table 1.

The polystyrene sulfonic acid was confirmed to be water-soluble at pH 8.

Example 7

A separator, a positive electrode, a negative electrode, and a lithium ion secondary battery were manufactured as in Example 1 except that xanthan gum (KELZANS, from Sansho Co., Ltd.) was used instead of acrylic polymer B as a water-soluble polymer and that the pH of the slurry composition for functional layer was changed to a level shown in Table 1. Evaluations were then performed as in Example 1. The results are shown in Table 1.

The xanthan gum was confirmed to be water-soluble at pH 8.

Example 8

A separator, a positive electrode, a negative electrode, and a lithium ion secondary battery were manufactured as in Example 1 except that spherical alumina was used instead of spherical barium sulfate as functional particles for porous membrane layer (non-conductive particles) and that the pH of the slurry composition for functional layer was changed to a level shown in Table 1. Evaluations were then performed as in Example 1. The results are shown in Table 1.

Example 9

A separator, a positive electrode, a negative electrode, and a lithium ion secondary battery were manufactured as in Example 1 except that flat boehmite was used instead of spherical barium sulfate as functional particles for porous membrane layer (non-conductive particles) and that the pH of the slurry composition for functional layer was changed to a level shown in Table 1. Evaluations were then performed as in Example 1. The results are shown in Table 1.

Examples 10 and 11

Separators, positive electrodes, negative electrodes, and lithium ion secondary batteries were manufactured as in Example 1 except that the blending amount of acrylic polymer B as a water-soluble polymer was changed as shown in Table 1 and that pH of the slurry composition for functional layer was changed to levels shown in Table 1. Evaluations were then performed as in Example 1. The results are shown in Table 1.

Examples 12 and 13

Separators, positive electrodes, negative electrodes, and lithium ion secondary batteries were manufactured as in Example 1 except that organic particles were used which were prepared as with organic particles A except that the blending amounts of methyl methacrylate as a (meth)acrylic acid ester monomer and ethylene glycol dimethacrylate as a cross-linkable monomer upon core formation were changed as shown in Table 1. Evaluations were then performed as in Example 1. The results are shown in Table 1.

Example 14

A separator, a positive electrode, a negative electrode, and a lithium ion secondary battery were manufactured as in Example 1 except that organic particles were used which were prepared as with organic particles A except that 20 parts of styrene as an aromatic vinyl monomer was used and that methacrylic acid as an acid group-containing monomer was not used upon shell formation. Evaluations were then performed as in Example 1. The results are shown in Table 1.

Example 15

A separator, a positive electrode, a negative electrode, and a lithium ion secondary battery were manufactured as in Example 1 except that organic particles were used which were prepared as with organic particles A except that the blending amount of styrene as an aromatic vinyl monomer was changed as shown in Table 1 and that 10 parts of sodium styrene sulfonate as a styrene derivative was used upon shell formation. Evaluations were then performed as in Example 1. The results are shown in Table 1.

Comparative Example 1

A separator, a positive electrode, a negative electrode, and a lithium ion secondary battery were manufactured as in Example 1 except that sodium salt of carboxymethyl cellulose (1120, from Daicel Corporation) was used instead of acrylic polymer B as a water-soluble polymer and that the pH of the slurry composition for functional layer was changed to a level shown in Table 1. Evaluations were then performed as in Example 1. The results are shown in Table 1.

The sodium salt of carboxymethyl cellulose was confirmed to be water-soluble at pH 8.

Comparative Example 2

A separator, a positive electrode, a negative electrode, and a lithium ion secondary battery were manufactured as in Example 1 except that sodium polyacrylate (L series, from Nippon Shokubai Co., Ltd.) was used instead of acrylic polymer B as a water-soluble polymer and that the pH of the slurry composition for functional layer was changed to a level shown in Table 1. Evaluations were then performed as in Example 1. 結果を表1に示す。

The sodium polyacrylate was confirmed to be water-soluble at pH 8.

Comparative Example 3

A separator, a positive electrode, a negative electrode, and a lithium ion secondary battery were manufactured as in Example 1 except that as a water-soluble polymer an acrylic polymer was used which was prepared as with acrylic polymer B except that the blending amounts of ethyl acrylate and butyl acrylate as (meth)acrylic acid ester monomers and methacrylic acid as an acid group-containing monomer were changed as shown in Table 1 and that the pH of the slurry composition for functional layer was changed to a level shown in Table 1. Evaluations were then performed as in Example 1. The results are shown in Table 1.

The acrylic polymer prepared was confirmed to be water-soluble at pH 8.

Comparative Example 4

A separator, a positive electrode, a negative electrode, and a lithium ion secondary battery were manufactured as in Example 1 except that polyacrylic acid (HL series, from Nippon Shokubai Co., Ltd.) was used instead of acrylic polymer B as a water-soluble polymer and that the pH of the slurry composition for functional layer was changed to a level shown in Table 1. Evaluations were then performed as in Example 1. The results are shown in Table 1.

The polyacrylic acid was confirmed to be water-soluble at pH 8.

TABLE 1

| | | | | Example 1 | Example 2 | Example 3 | Example 4 | Example 5 | Example 6 | Example 7 | Example 8 | Example 9 | Example 10 |
|---|---|---|---|---|---|---|---|---|---|---|---|---|---|
| Functional layer | Non-conductive particles | Type | | Barium sulfate | Barium sulfate | Barium sulfate | Barium sulfate | Barium sulfate | Barium sulfate | Barium sulfate | Alumina | Boehmite | Barium sulfate |
| | | Shape | | Spherical | Spherical | Spherical | Spherical | Spherical | Spherical | Spherical | Spherical | Flat | Spherical |
| | | Blending amount [parts by mass] | | 100 | 100 | 100 | 100 | 100 | 100 | 100 | 100 | 100 | 100 |
| | Water-soluble polymer | Polymer | Composition | Ethyl acrylate [parts by mass] | 57 | 65 | 39 | 19 | 57 | — | — | 57 | 57 | 57 |
| | | | | Butyl acrylate [parts by mass] | 12.2 | 12.2 | 12.2 | 12.2 | 12.2 | — | — | 12.2 | 12.2 | 12.2 |
| | | | | Methacrylic acid [parts by mass] | 30 | 22 | 48 | 68 | 30 | — | — | 30 | 30 | 30 |
| | | | | Ethylene glycol dimethacrylate [parts by mass] | 0.8 | 0.8 | 0.8 | 0.8 | 0.8 | — | — | 0.8 | 0.8 | 0.8 |
| | | | | Blending amount [parts by mass] | 1.5 | 1.5 | 1.5 | 1.5 | 1.5 | 1.5 | — | 1.5 | 1.5 | 0.2 |
| | | | | Polystyrene sulfonic acid [parts by mass] | — | — | — | — | — | — | 1.5 | — | — | — |
| | | | | Xanthane gum [parts by mass] | — | — | — | — | — | — | — | — | — | — |
| | | | | Sodium salt of Carboxymethyl cellulose [parts by mass] | — | — | — | — | — | — | — | — | — | — |
| | | | | Sodium polyacrylate [parts by mass] | — | — | — | — | — | — | — | — | — | — |
| | | | | Polyacrylic acid [parts by mass] | — | — | — | — | — | — | — | — | — | — |
| | | | | Water drop contact angle [°] | 54 | 60 | 51 | 45 | 58 | 51 | 33 | 54 | 54 | 54 |
| | Particulate polymer for functional layer | Type | | Polymer A | Polymer A | Polymer A | Polymer A | Polymer A | Polymer A | Polymer A | Polymer A | Polymer A | Polymer A |
| | | Blending amount [parts by mass] | | 6 | 6 | 6 | 6 | 6 | 6 | 6 | 6 | 6 | 6 |
| | Slurry pH [—] | | | 7.2 | 7.3 | 7 | 7 | 10.5 | 7 | 7 | 9.5 | 8.3 | 7.4 |
| Adhesive layer | Organic particles | Core | Composition | Methyl methacrylate [parts by mass] | 75 | 75 | 75 | 75 | 75 | 75 | 75 | 75 | 75 | 75 |
| | | | | Methacrylic acid [parts by mass] | 4 | 4 | 4 | 4 | 4 | 4 | 4 | 4 | 4 | 4 |
| | | | | Ethylene glycol dimethacrylate [parts by mass] | 1 | 1 | 1 | 1 | 1 | 1 | 1 | 1 | 1 | 1 |
| | | | | Degree of swelling in electrolysis solution [—] | 9.6 | 9.6 | 9.6 | 9.6 | 9.6 | 9.6 | 9.6 | 9.6 | 9.6 | 9.6 |
| | | | | Glass-transition temperature [° C.] | 91 | 91 | 91 | 91 | 91 | 91 | 91 | 91 | 91 | 91 |
| | | Shell | Composition | Styrene [parts by mass] | 19 | 19 | 19 | 19 | 19 | 19 | 19 | 19 | 19 | 19 |
| | | | | Methacrylic acid [parts by mass] | 1 | 1 | 1 | 1 | 1 | 1 | 1 | 1 | 1 | 1 |
| | | | | Sodium styrene sulfonate [parts by mass] | — | — | — | — | — | — | — | — | — | — |
| | | | | Degree of swelling in electrolysis solution [—] | 1.3 | 1.3 | 1.3 | 1.3 | 1.3 | 1.3 | 1.3 | 1.3 | 1.3 | 1.3 |
| | | | | Glass-transition temperature [° C.] | 100 | 100 | 100 | 100 | 100 | 100 | 100 | 100 | 100 | 100 |
| | | Core-shell ratio [%] | | 10 | 10 | 10 | 10 | 10 | 10 | 10 | 10 | 10 | 10 |
| | | Ratio of coverage [%] | | 65 | 65 | 65 | 65 | 65 | 65 | 65 | 65 | 65 | 65 |

TABLE 1-continued

| | | | Example 11 | Example 12 | Example 13 | Example 14 | Example 15 | Comparative Example 1 | Comparative Example 2 | Comparative Example 3 | Comparative Example 4 |
|---|---|---|---|---|---|---|---|---|---|---|---|
| | Particulate polymer for adhesive layer | Volume-average particle diameter [μm] | 0.45 | 0.45 | 0.45 | 0.45 | 0.45 | 0.45 | 0.45 | 0.45 | 0.45 |
| | | Blending amount [parts by mass] | 100 | 100 | 100 | 100 | 100 | 100 | 100 | 100 | 100 |
| | | Type | Polymer A | Polymer A | Polymer A | Polymer A | Polymer A | Polymer A | Polymer A | Polymer A | Polymer A |
| | | Blending amount [parts by mass] | 6 | 6 | 6 | 6 | 6 | 6 | 6 | 6 | 6 |
| Evaluation | | Wetting agent [parts by mass] | 0.2 | 0.2 | 0.2 | 0.2 | 0.2 | 0.2 | 0.2 | 0.2 | 0.2 |
| | | Peel strength | A | A | A | A | A | C | A | C | B |
| | | Permeability | A | A | A | A | A | B | A | B | A |
| | | Bulging resistance | A | A | A | A | B | C | A | B | B |
| | | Cycle characteristics | A | A | A | A | A | B | A | B | B |
| | | Rate characteristics | A | A | A | B | A | B | A | B | A |
| Functional layer | Non-conductive particles | Type | Barium sulfate | Barium sulfate | Barium sulfate | Barium sulfate | Barium sulfate | Barium sulfate | Barium sulfate | Barium sulfate | Barium sulfate |
| | | Shape | Spherical | Spherical | Spherical | Spherical | Spherical | Spherical | Spherical | Spherical | Spherical |
| | | Blending amount [parts by mass] | 100 | 100 | 100 | 100 | 100 | 100 | 100 | 100 | 100 |
| | Water-soluble polymer | Composition Ethyl acrylate [parts by mass] | 57 | 57 | 57 | 57 | 57 | — | — | 12 | — |
| | | Butyl acrylate [parts by mass] | 12.2 | 12.2 | 12.2 | 12.2 | 12.2 | — | — | 12.2 | — |
| | | Methacrylic acid [parts by mass] | 30 | 30 | 30 | 30 | 30 | — | — | 75 | — |
| | | Ethylene glycol dimethacrylate [parts by mass] | 0.8 | 0.8 | 0.8 | 0.8 | 0.8 | — | — | 0.8 | — |
| | | Blending amount [parts by mass] | 8 | 1.5 | 1.5 | 1.5 | 1.5 | — | — | 1.5 | — |
| | | Polystyrene sulfonic acid [parts by mass] | — | — | — | — | — | — | — | — | — |
| | | Xanthane gum [parts by mass] | — | — | — | — | — | 1.5 | — | — | — |
| | | Sodium salt of Carboxymethyl cellulose [parts by mass] | — | — | — | — | — | — | 1.5 | — | — |
| | | Sodium polyacrylate [parts by mass] | — | — | — | — | — | — | — | — | — |
| | | Polyacrylic acid [parts by mass] | — | — | — | — | — | — | — | — | 1.5 |
| | | Water drop contact angle [°] | 54 | 54 | 54 | 54 | 54 | 20 | 25 | 28 | 87 |
| | Particulate polymer for functional layer | Type | Polymer A | Polymer A | Polymer A | Polymer A | Polymer A | Polymer A | Polymer A | Polymer A | Polymer A |
| | | Blending amount [parts by mass] | 6 | 6 | 6 | 6 | 6 | 6 | 6 | 6 | 6 |
| Adhesive layer | | Slurry pH [—] | 7 | 7.2 | 7.2 | 7.2 | 7.2 | 8.9 | 8.5 | 7.1 | 7.1 |
| | Organic particles | Core Composition Methyl methacrylate [parts by mass] | 75 | 75.95 | 71.5 | 75 | 75 | 75 | 75 | 75 | 75 |
| | | Methacrylic acid [parts by mass] | 4 | 4 | 4 | 4 | 4 | 4 | 4 | 4 | 4 |
| | | Ethylene glycol dimethacrylate [parts by mass] | 1 | 0.05 | 4.5 | 1 | 1 | 1 | 1 | 1 | 1 |
| | | Degree of swelling in electrolysis solution [—] | 9.6 | 28.5 | 5.2 | 9.6 | 9.6 | 9.6 | 9.6 | 9.6 | 9.6 |
| | | Glass-transition temperature [° C.] | 91 | 91 | 89 | 91 | 91 | 91 | 91 | 91 | 91 |

TABLE 1-continued

| | | | | | | | | | | | |
|---|---|---|---|---|---|---|---|---|---|---|---|
| Shell | Composition | Styrene [parts by mass] | 19 | 19 | 19 | 20 | 9 | 19 | 19 | 19 | 19 |
| | | Methacrylic acid [parts by mass] | 1 | 1 | 1 | — | 1 | 1 | 1 | 1 | 1 |
| | | Sodium styrene sulfonate [parts by mass] | — | — | — | — | 10 | — | — | — | — |
| | Degree of swelling in electrolysis solution [—] | | 1.3 | 1.3 | 1.3 | 1.1 | 3.3 | 1.3 | 1.3 | 1.3 | 1.3 |
| | Glass-transition temperature [° C.] | | 100 | 100 | 100 | 100 | 101 | 100 | 100 | 100 | 100 |
| Core-shell ratio [%] | | | 10 | 10 | 10 | 10 | 10 | 10 | 10 | 10 | 10 |
| Ratio of coverage [%] | | | 65 | 65 | 65 | 65 | 65 | 65 | 65 | 65 | 65 |
| Volume-average particle diameter [μm] | | | 0.45 | 0.45 | 0.45 | 0.45 | 0.45 | 0.45 | 0.45 | 0.45 | 0.45 |
| Blending amount [parts by mass] | | | 100 | 100 | 100 | 100 | 100 | 100 | 100 | 100 | 100 |
| Particulate polymer for adhesive layer | Type | | Polymer A | Polymer A | Polymer A | Polymer A | Polymer A | Polymer A | Polymer A | Polymer A | Polymer A |
| | Blending amount [parts by mass] | | 6 | 6 | 6 | 6 | 6 | 6 | 6 | 6 | 6 |
| Wetting agent [parts by mass] | | | 0.2 | 0.2 | 0.2 | 0.2 | 0.2 | 0.2 | 0.2 | 0.2 | 0.2 |
| Evaluation | Peel strength | | A | A | A | A | A | D | D | D | D |
| | Permeability | | B | A | A | A | A | C | C | D | D |
| | Bulging resistance | | A | A | A | A | B | C | D | C | C |
| | Cycle characteristics | | B | B | B | B | A | C | C | C | C |
| | Rate characteristics | | B | A | B | B | A | D | D | D | C |

The results shown in Table 1 reveal that Examples 1 to 15 wherein a water-soluble polymer with a water drop contact angle that falls within a given range was used are able to provide a secondary battery with good electrical characteristics by enabling the porous membrane layer to exert an expected function to suppress reductions in peel strength of the separator while preventing cell bulging.

The results shown in Table 1 also reveal that Comparative Examples 1 to 4 wherein a water-soluble polymer with a water drop contact angle that falls outside a given range was used are unable to provide a secondary battery with good electrical characteristics due to failure to enable the porous membrane layer to exert an expected function and failure to suppress reductions in peel strength of the separator.

The results of Examples 1 to 4, 6 and 7 shown in Table 1 also reveal that adjustment of the type and composition of the water-soluble polymer to attain an appropriate level of water drop contact angle results in further improvements in the function of the porous membrane layer, peel strength of the separator, and electrical characteristics of the secondary battery.

The results of Examples 1 and 5 shown in Table 1 reveal that adjustment of the pH of the slurry composition for functional layer to fall within an appropriate range results in improvements in cycle characteristics of the secondary battery.

The results of Examples 1, 8 and 9 shown in Table 1 reveal that the use of spherical particles as non-conductive particles results in further improvements in the functional of the porous membrane layer, peel strength of the separator, and electrical characteristics of the secondary battery.

The results of Examples 1, 10 and 11 shown in Table 1 reveal that adjustment of the blending amount of the water-soluble polymer results in further improvements in electrical characteristics of the secondary battery while suppressing reductions in permeability of the porous membrane layer. The results of Examples 1, 10 and 11 shown in Table 1 also reveal that high levels of peel strength and bulging resistance can be attained at the same time.

The results of Examples 1 and 12 to 15 shown in Table 1 reveal that the use of organic particles with specific properties results in further improvements in electrical characteristics of the secondary battery.

INDUSTRIAL APPLICABILITY

According to this disclosure, it is possible to provide a laminate for non-aqueous secondary battery which includes a water-soluble polymer-containing functional layer and an adhesive layer adjacently disposed on the functional layer, and which can suppress reductions in peel strength of a battery member including the laminate while allowing the functional layer to exert an expected function.

According to this disclosure, it is also possible to provide a non-aqueous secondary battery with superior electrical characteristics.

REFERENCE SIGNS LIST

100 organic particle
110 core
110S outer surface of core
120 shell

The invention claimed is:

1. A laminate for non-aqueous secondary battery, comprising:
    a functional layer containing functional particles and a water-soluble polymer; and
    an adhesive layer adjacently disposed on the functional layer,
    wherein a film obtained by shaping of the water-soluble polymer has a water drop contact angle of 30° to 80°,
    the adhesive layer contains organic particles,
    the organic particles each have a core-shell structure having a core and a shell that partially covers an outer surface of the core,
    the core is made of polymer having a degree of swelling in electrolysis solution of 5 times to 30 times by mass,
    the shell is made of polymer having a degree of swelling in electrolysis solution of greater than 1 time to 4 times by mass, and
    the electrolysis solution is prepared by dissolving supporting electrolyte $LiPF_6$ into a mixture solvent of ethylene carbonate (EC), diethyl carbonate (DEC) and vinylene carbonate (VC) (mixing ratio: EC/DEC/VC=68.5/30/1.5 (by volume)) at a concentration of 1 mol/L.

2. The laminate for non-aqueous secondary battery of claim 1, wherein the adhesive layer contains a wetting agent.

3. The laminate for non-aqueous secondary battery of claim 1, wherein the water-soluble polymer is xanthan gum, polystyrene sulfonic acid, or a copolymer containing a (meth)acrylic acid ester monomer unit, an acid group-containing monomer unit and a cross-linkable monomer unit.

4. The laminate for non-aqueous secondary battery of claim 1, wherein a content of the water-soluble polymer in the functional layer is 0.5 parts by mass or more and 10 parts by mass or less per 100 parts by mass of functional particles.

5. A method of manufacturing the laminate for non-aqueous secondary battery of claim 1, the method comprising:
    applying an adhesive layer composition containing a hydrophilic solvent onto a surface of the functional layer containing the functional particles and the water-soluble polymer; and
    drying the adhesive layer composition applied to form the adhesive layer.

6. A non-aqueous secondary battery comprising the laminate for non-aqueous secondary battery of claim 1.

* * * * *